United States Patent [19]

Inuiya et al.

[11] Patent Number: 6,147,706
[45] Date of Patent: Nov. 14, 2000

[54] VIDEO CAMERA, PRINTER APPARATUS AND METHOD OF CONTROLLING SAME, AND APPARATUS AND METHOD FOR DETECTING PRINT INHIBIT SIGNAL

[75] Inventors: Masafumi Inuiya; Michitoshi Takayama; Kazuya Oda; Takeshi Misawa; Yasuko Sonoda, all of Asaka, Japan

[73] Assignee: Fuji Photo Film Co., Ltd., Kanagawa, Japan

[21] Appl. No.: 09/239,147

[22] Filed: Jan. 28, 1999

Related U.S. Application Data

[62] Division of application No. 08/778,373, Jan. 2, 1997, Pat. No. 5,966,173, which is a division of application No. 08/493,113, Jun. 21, 1995, Pat. No. 5,625,411, which is a continuation of application No. 08/171,664, Dec. 22, 1993, abandoned.

[30] Foreign Application Priority Data

| Dec. 22, 1992 | [JP] | Japan | 4-356405 |
| Dec. 22, 1992 | [JP] | Japan | 4-356406 |
| Dec. 29, 1992 | [JP] | Japan | 4-361190 |

[51] Int. Cl.[7] .......................... H04N 9/73; H04N 5/235; H04N 5/238
[52] U.S. Cl. .................. 348/226; 348/221; 348/222; 348/364
[58] Field of Search .................... 348/220–226, 348/228–230, 255, 296–298, 311, 312, 362–367; 250/208.1; H04N 5/235, 5/238, 9/73

[56] References Cited

U.S. PATENT DOCUMENTS

| 4,881,127 | 11/1989 | Isoguchi | 348/296 |
| 4,984,002 | 1/1991 | Kokubo | 348/290 |
| 5,140,420 | 8/1992 | Hurst | 348/478 |
| 5,153,729 | 10/1992 | Saito | 348/232 |
| 5,157,502 | 10/1992 | Nakajima et al. | 348/296 |
| 5,173,779 | 12/1992 | Lee | 348/231 |
| 5,258,834 | 11/1993 | Tsuji et al. | 348/71 |
| 5,258,848 | 11/1993 | Kondo et al. | 348/229 |
| 5,289,227 | 2/1994 | Kinjo | 396/78 |
| 5,311,311 | 5/1994 | Harigai et al. | 348/473 |
| 5,331,949 | 7/1994 | Funakoshi et al. | 600/109 |
| 5,493,409 | 2/1996 | Maeda et al. | 358/296 |
| 5,559,552 | 9/1996 | Inuiya et al. | 348/220 |
| 5,663,761 | 9/1997 | Fukui | 348/323 |
| 5,831,676 | 11/1998 | Takahashi et al. | 348/362 |
| 5,883,666 | 3/1999 | Kyuma et al. | 348/229 |

*Primary Examiner*—Wendy Garber
*Assistant Examiner*—Ngoc-Yen Vu

[57] ABSTRACT

A reproduced still picture having a comparatively high picture quality is obtained irrespective of the luminance of the subject. In an interval photography mode, photography is performed one time in a plurality of fields at a relatively high shutter speed of $\frac{1}{250}$ of a second to obtained a first video signal, and photography is performed at an ordinary shutter speed of $\frac{1}{60}$ of a second in other fields to obtain a second video signal. These video signals are amplified at mutually different first and second amplification factors (6 dB and 18.4 dB, respectively) in conformity with the shutter speed, by an AGC. The first and second amplification factors are varied in dependence upon the illumination of the subject in such a manner that the average levels of the first and second video signals are maintained at a fixed level.

7 Claims, 18 Drawing Sheets

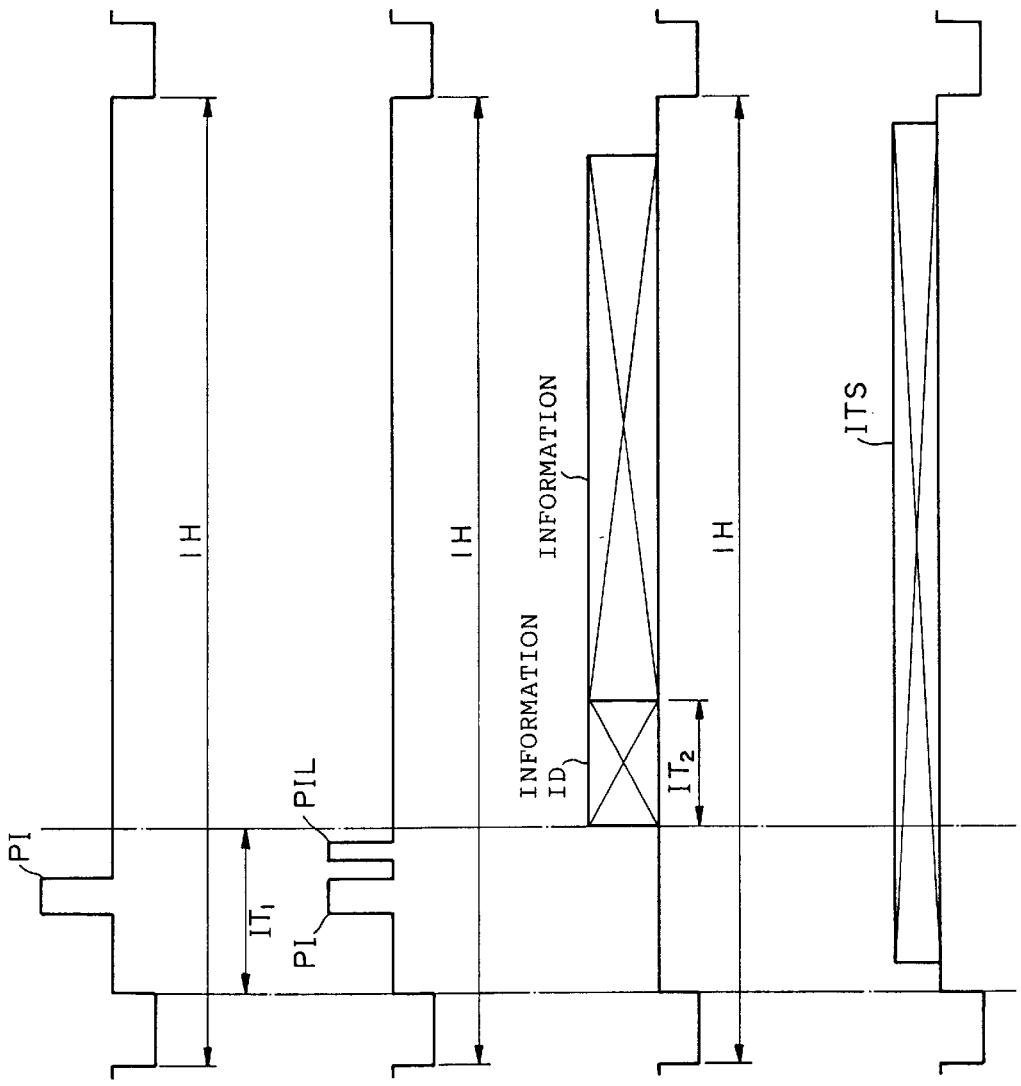

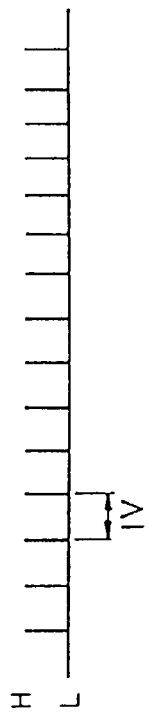
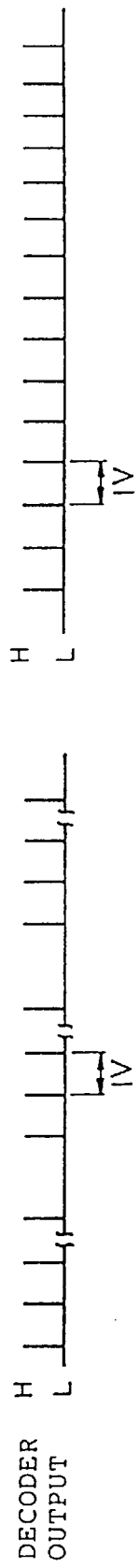
Fig. 9b-1
Fig. 9b-2
Fig. 9b-3
Fig. 9b-4
Fig. 9a-1
Fig. 9a-2
Fig. 9a-3
Fig. 9a-4
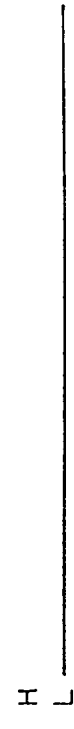
DECODER OUTPUT
MM1 OUTPUT
MM2 OUTPUT
AND OUTPUT

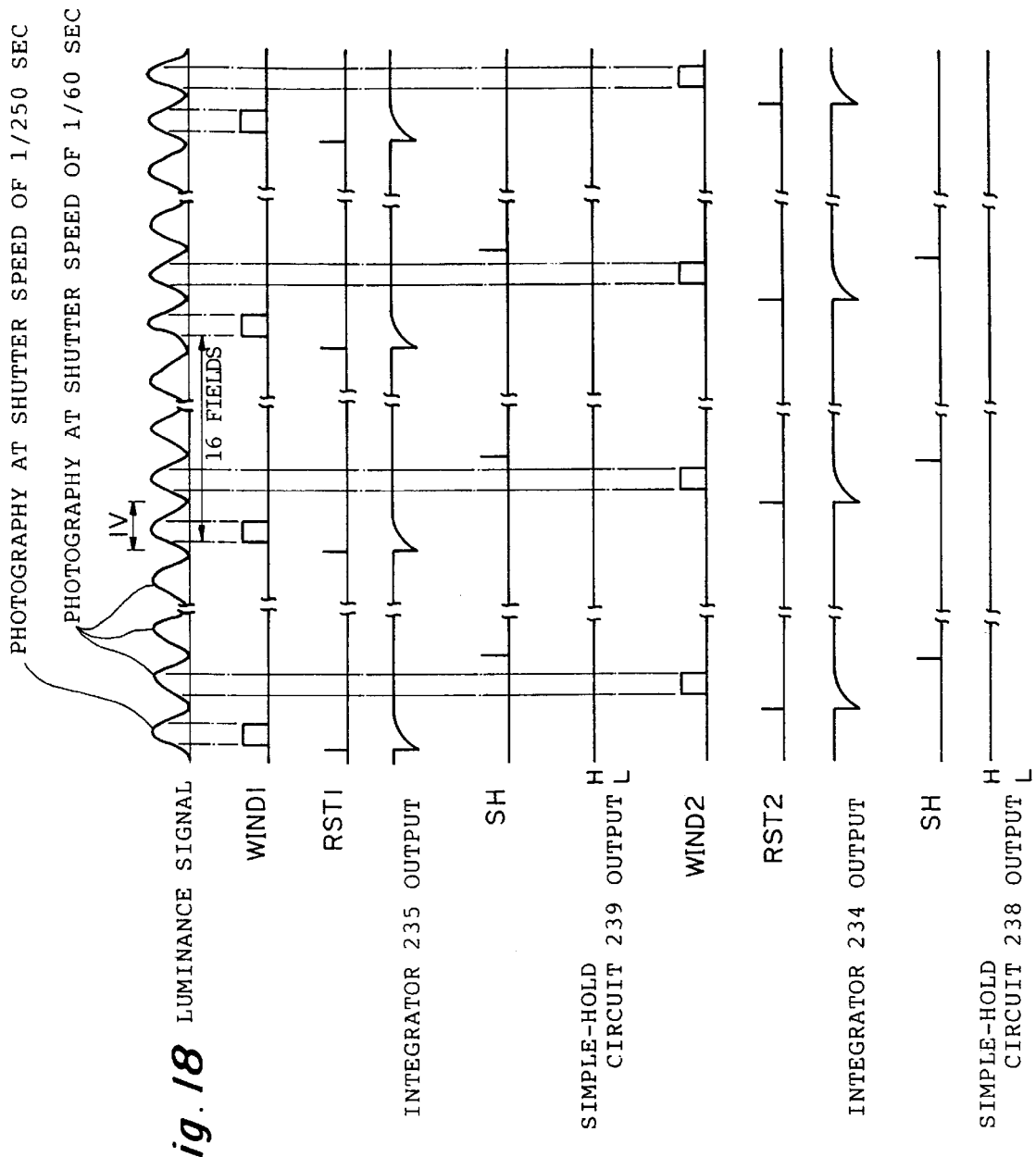

VIDEO CAMERA, PRINTER APPARATUS AND METHOD OF CONTROLLING SAME, AND APPARATUS AND METHOD FOR DETECTING PRINT INHIBIT SIGNAL

This application is a divisional of application Ser. No. 08/778,373 filed Jan. 2, 1997, now U.S. Pat. No. 5,966,173 which is a divisional of application Ser. No. 08/493,113, filed on Jun. 21, 1995, now U.S. Pat. No. 5,625,411 which is a continuation of application Ser. No. 08/171,664 filed on Dec. 22, 1993, now abandoned the entire contents of which are hereby incorporated by reference.

BACKGROUND OF THE INVENTION

1. Field of the Invention

This invention relates to a video camera for recording a video signal, which is obtained by continuously photographing a subject, and reproducing the recording video signal in the form of still pictures or a movie; a printer apparatus which, using the video signal recorded by the video camera, produces a printed picture of the image represented by the video signal and a method of controlling the video camera and the printer apparatus. The invention further relates to a circuit which, when a print inhibit signal has been superposed upon the video signal, detects the print inhibit signal; and a method of detecting the superposed print inhibit signal.

2. Related Art

In general, a video camera performs photography at a shutter speed of $1/60$ of a second. As a consequence, if it is attempted to reproduce a still picture of one frame of the moving subject from the movie video signal, only a blurred picture of the moving image can be reproduced.

In order to obtain a sharp picture when reproducing a still picture of a moving subject, photography must be performed at a high shutter speed. Although a movie video camera capable of performing continuous photography at a high shutter speed has been proposed, the impression of continuity of the image from one frame to the next at the time of movie playback is lacking and the motion of the subject in the reproduced image appears unnatural. Thus, movie playback and still playback are incompatible.

Accordingly, consideration may be given to a method through which a plurality of successive frames are photographed at a shutter speed of $1/60$ of a second, and one frame among these frames is photographed at a high shutter speed (e.g., $1/250$ of a second). In accordance with this method, high-speed photography is performed only once every several frames so that there is no loss in the impression of continuity of the picture.

Nevertheless, when photography is performed at a high shutter speed, the level of the video signal is lower than that of the video signal in a case where photography is performed at an ordinary shutter speed. When the resulting image is printed, therefore, the printed picture may be too dark. Furthermore, if the subject is illuminated by a fluorescent lamp, the image of the subject is affected by flickering of the fluorescent lamp.

Another problem encountered in an effort to make both still playback and movie playback feasible is how to deal with a decline in the brightness of the subject. When shutter speed is raised for the purpose of obtaining a still reproduction, there is a decline in the level of the video signal obtained from a solid-state electronic image sensing device. If there is a decline in the brightness of the subject, there is a further decline in the level of the video signal. When a video signal of a low level is reproduced in the form of a still picture, a sufficiently sharp picture is difficult to obtain.

On other hand, when a subject such as a person is photographed indoors, the subject is illuminated by the light from a lamp within the room. Since the luminance of light from a fluorescent lamp fluctuates at a frequency twice that of a commercial AC power supply, the reproduced image may develop flicker when the video signal obtained by performing photography under such illuminating light is reproduced. In other words, when a subject illuminated by a fluorescent lamp is photographed and the resulting image is played back in the form of a movie, there will be cases in which the image flickers and appears unattractive.

SUMMARY OF THE INVENTION

An object of the present invention is to make it possible to obtain a blur-free, sharp reproduced still picture of a moving subject and to play back a movie of the subject in such a manner that the movie gives an impression of continuity and possesses natural motion.

Another object of the present invention is to make it possible for a video signal obtained by photography at a high shutter speed and a video signal obtained by photography at an ordinary shutter speed of $1/60$ of a second to be distinguished from each other at reproduction.

A further object of the present invention is to make it possible for the level of a video signal obtained by photography at a high shutter speed and the level of a video signal obtained by photography at an ordinary shutter speed to be made approximately equal.

Still another object of the present invention is to prevent, as much as possible, a decline in the picture quality of a reproduced still picture even if there is a decline in brightness of the subject.

A further object of the present invention is to prevent the impression of flickering of a reproduced image resulting from the effects of flicker.

A video camera according to a first aspect of the present invention comprises shutter implementing means capable of implementing a shutter having a high shutter speed and a shutter having an ordinary shutter speed, shutter control means for controlling the shutter implementing means in such a manner that exposure at the high shutter speed is performed one time periodically in photography performed a plurality of times in succession and exposure at the ordinary shutter speed is performed at other times, photographic means for outputting a first video signal representing an image of a subject when the subject is exposed at the ordinary shutter speed and a second video signal representing the image of the subject when the subject is exposed at the high shutter speed, and recording means for recording the first and second video signals, which are obtained from the photographic means, on a recording medium.

The present invention further provides a method of controlling the video camera.

The shutter implementing means includes an ordinary mechanical shutter and a so-called electronic shutter. In the electronic shutter, exposure time (shutter speed) is defined by a length of time from the moment at which unnecessary electric charge is cleared from a solid-state electronic image sensing device to the moment at which a signal electric charge is read out of the image sensing device.

The ordinary shutter speed refers to a shutter speed of $1/60$ of a second generally used in video cameras, and the high shutter speed refers to a shutter speed higher than the ordinary (1/60 of a second), such as a shutter speed of 1/125 or 1/250 of a second.

According to the present invention, photography at the high shutter speed is performed one time periodically in photography performed a plurality of times in succession and photography at the ordinary shutter speed is performed at other times.

Photography performed one time is processing for obtaining one field of a video signal when a field mode is in effect and processing for obtaining one frame (two fields) of a video signal when a frame mode is in effect.

Accordingly, a sharp picture is obtained by reproducing a still picture (creating a printed picture or displaying an image on the screen of a display unit) using the video signal acquired by photography at the high shutter speed. Further, since photography at the high shutter speed is carried out only one time in photography performed a plurality of times in succession, no unusual impression is given when a movie is reproduced. The resulting moving has a natural appearance.

The inventor has learned from experience that photography at a high shutter speed (in the case of 1/250 of a second) should be performed one time periodically in photography carried out 16 times in succession (in the field mode). If photography at a high shutter speed is performed at a period on this order, an unnatural impression can be prevented at playback in the form of a movie.

When an ordinary picture is taken, the maximum time interval for obtaining a desired picture without missing an opportunity for a good shot is on the order of one second. Therefore, in consideration of the photographer's wish not to lose a good photo opportunity, it would be desirable for photography at the high shutter speed to be performed one time periodically in photography carried out no more than 60 times in succession in the field mode.

In an embodiment of the invention ideal for a case in which a printed picture is obtained using a video signal obtained by photography at the high shutter speed, a print inhibit signal indicating that the image represented by the first video signal is forbidden from being printed is superposed in a vertical blanking interval related to the first video signal, which is obtained by exposure at the ordinary shutter speed, from the video signals outputted by the photographic means.

Most generally the print inhibit signal would be inserted in the vertical blanking interval that immediately precedes the appearance of the first video signal.

In a printer apparatus provided with a video signal outputted by a video camera according to the invention or a video signal read out of the recording medium recorded on by the video camera, the first video signal obtained by photography at the ordinary shutter speed and the second video signal obtained by photography at the high shutter speed can be distinguished from each other by detecting the print inhibit signal. Accordingly, the second video signal obtained by photography at the high shutter speed can be selected without fail so that a sharp printed picture can be produced.

Furthermore, the print inhibit signal preferably is superposed between a 17th horizontal synchronizing signal and an 18th horizontal synchronizing signal in a vertical blanking interval of the first video signal.

In general, various signals are superposed within the vertical blacking interval. For example, an ITS (interface test signal) is inserted in a broadcast wave. The ITS is superposed between the 17th horizontal synchronizing signal and 18th horizontal synchronizing signal as well. However, the signal superposed here is a test signal of a broadcast station and therefore is unrelated to a playback device or picture receiving device. The print inhibit signal thus can be superposed between the 17th horizontal synchronizing signal and 18th horizontal synchronizing signal without causing problems. When loss of synchronization and the frequency characteristic are taken into account, it is preferred that the print inhibit signal be superposed in the latter half of the vertical blanking interval.

In another embodiment of the invention, a warning signal indicating that the second video signal obtained by photography at the high shutter speed will appear next is superposed in the vertical blanking interval of the first video signal outputted by the photographic means by photography at the ordinary shutter speed immediately preceding the photography performed at the high shutter speed.

The fact that the second video signal resulting from photography at the high shutter speed will appear next is recognized by detection of the warning signal. In a printer that prints a picture based upon the second video signal, preparations for printing processing can be made in response to detection of the warning signal. Accordingly, the appropriate printing processing is possible even in a printer that includes a processing circuit having a slow processing speed.

In another preferred embodiment of the invention, an information signal representing photographic information prevailing when the second video signal is obtained and print information useful when printing a picture represented by the second video signal is superposed in a vertical blanking interval related to the second video signal, which is obtained by photography under a high shutter speed, from the video signals outputted by the photographic means.

The information represented by the information signal is composed of the fact that use was made of a shutter speed other than 1/60 of a second, the shutter speed, F number, color temperature, date prevailing at the time of photography, the title, whether the mode is the field or frame mode, the magnetic recording format (8 mm normal; 8 mm high; VHS; S-VHS, etc.), the frame number, etc. These items of information are detected in the printer apparatus, thereby facilitating the preparation of a printed picture. Frame numbers are consecutive numbers assigned with regard to the second video signal and are useful in searching for a specific still picture that has been photographed.

In a preferred embodiment of the invention, the video camera further comprises an amplifier circuit for amplifying the video signal outputted by the photographic means, and gain control means for controlling the gain of the amplifier circuit in such a manner that the level of the second video signal obtained by exposure at the high shutter speed will become approximately equal to the level of the first video signal obtained by exposure at the ordinary shutter speed.

Since exposure time is shortened when photography is performed at the high shutter speed, the level of the video signal obtained declines overall and the reproduced image darkens. In accordance with this embodiment, gain is controlled in such a manner that the average level of the second video signal becomes approximately equal to the level of the first video signal. As a result, the reproduced image obtained has a brightness approximately equal to that of the reproduced image based upon the first video signal obtained by photography at the ordinary shutter speed. This eliminates any unnatural impression when an image is played back in the form of a movie.

A circuit for detecting a print inhibit signal according to a second aspect of the present invention comprises reading means for reading video signals from a recording medium on which a first video signal and a second video signal have been recorded in such a manner that one frame of the second video signal appears one time in a prescribed plurality of frames of the first video signal, wherein the first video signal represents the image of a subject photographed at an ordinary shutter speed and has a print inhibit signal, which represents inhibition of printing of an image represented by the video signal, superposed thereon in a vertical blanking interval, and the second video signal represents the image of the subject photographed at a high shutter speed, superposed-signal detecting means for detecting and outputting the superposed signal, which has been superposed in the vertical blanking interval, from the video signal read by the reading means, superposed-signal output verifying means for verifying whether the superposed signal detected and outputted by the superposed-signal detecting means ceases periodically, and a print-inhibit signal output circuit for outputting, as the print inhibit signal, the superposed signal detected by the superposed-signal detecting means when the superposed-signal output verifying means has verified that output of the superposed signal ceases periodically.

The circuit for detecting the print inhibit signal is provided in the printer apparatus. According to the invention, the print inhibit signal superposed upon the video signal using the above-described video camera can be detected. Accordingly, it can be determined that a video signal for which the print inhibit signal has not been detected has been obtained by photography at the high shutter speed, and a printed picture having a sharp image can be obtained in the printer apparatus based solely upon a video signal obtained by photography performed at a high shutter speed. In detection of the print inhibit signal, whether the signal superposed in the vertical blanking interval of the video signal stops periodically is verified. As a result, a print inhibit signal superposed in association with the first video signal that appears at a fixed period can be detected upon being distinguished from the aforesaid ITS or the like that appears in all vertical blanking intervals.

The circuit for detecting a print inhibit signal according to the present invention is suitable also for use in a display unit. In such case, only a sharp still picture based upon the second video signal will be displayed on the display unit.

A printer apparatus according to a third aspect of the present invention comprises print-inhibit signal detecting means for detecting a print inhibit signal, which has been superposed in a vertical blanking interval, from a video signal wherein a second video signal, which represents an image of a subject photographed at a high shutter speed, has been inserted in a prescribed plurality of frames of a first video signal representing the image of the subject photographed at an ordinary shutter speed and having a print inhibit signal, which represents inhibition of printing of an image represented by the video signal, superposed thereon in a vertical blanking interval, memory control means for performing control, based upon the print inhibit signal outputted by the print-inhibit signal detecting means, in such a manner that a video signal not containing the print inhibit signal in its vertical blanking interval is stored in memory means, and printing means for reading the video signal stored in the memory means out of the memory means based upon control performed by the memory control means, and printing an image represented by the video signal that has been read out.

In accordance with the invention, there is provided an apparatus for printing an image represented by a video signal stored on a recording medium by a video camera. The printer apparatus is supplied with the video signal read from the recording medium. It is of course possible to provide the printer apparatus with means for reading the video signal from the recording medium.

In either case, the print inhibit signal superposed upon the video signal in the vertical blanking interval thereof is detected, a designated part of the second video signal not accompanied by the print inhibit signal is stored in the memory means and is used as image data for creating a printed picture. Thus, since a printed picture is created based solely upon the second video signal obtained by photography at the high shutter speed, a sharp still picture is obtained at all times.

A print inhibit signal is not inserted in a video signal obtained in the conventional video camera. Accordingly, even if the video signal obtained with the conventional video camera is applied to the printer apparatus of the present invention, the printer apparatus will perform a printing operation. In other words, the printer apparatus according to the present invention is applicable to video signals produced by both the video camera of the present invention and video cameras according to the prior art.

In a preferred embodiment of the printer apparatus according to the present invention, the apparatus is further provided with warning-signal detecting means for detecting whether a warning signal, which indicates that the second video signal will appear, has been superposed in a vertical blanking interval of the first video signal immediately preceding the appearance of the second video signal, and preparation-signal output means responsive to detection of the warning signal by the warning-signal detecting means for outputting a preparation signal to the memory control means so as to prepare control, executed by the memory control means, for storage of the video signal in the memory means.

Since preparation for storage of the video signal in the memory means can thus be carried out, a video signal obtained by photography at the high shutter speed can be stored reliably and printed even in a printer apparatus having a control circuit exhibiting a slow operating speed.

In another embodiment, the printer apparatus is further provided with printing-condition signal detecting means for detecting an information signal, which is superposed in the vertical blanking interval of the second video signal, representing photographic information prevailing when the second video signal is obtained or print information useful when printing a picture represented by the second video signal.

The information detected may be displayed on the display unit of the printer apparatus whenever required in order to assist the user. Alternatively, the information may be used in order to control the printing operation performed by the printer apparatus in order to produce a printed picture.

A video camera according to a fourth aspect of the present invention comprises shutter implementing means for periodically repeating exposure performed at a high shutter speed one time in photography of a prescribed plurality of successive frames and exposure performed at an ordinary shutter speed at other times, photographic means for outputting a first video signal when exposure is performed at the ordinary shutter speed and a second video signal when exposure is performed at the high shutter speed, an amplifier circuit for amplifying the first and second video signals, which are outputted by the photographic means, at two different amplification factors in such a manner that the level of the first video signal will become approximately equal to the level of the second video signal, first integrating means for integrating one frame of the first video signal and outputting a first integrated value, a second integrating means for integrating one frame of second first video signal and outputting a second integrated value, subtracting means for producing a difference signal representing the difference between the first and second integrated values, and adjusting means for adjusting at least one of the two different amplification factors of the amplifier circuit, based upon the difference obtained from the subtracting means, in such a manner that the difference is eliminated.

A method of controlling a video camera according to a fourth aspect of the present invention comprises a step of periodically repeating exposure performed at a high shutter speed one time in photography of a prescribed plurality of successive frames and exposure performed at an ordinary shutter speed at other times, a step of obtaining a first video signal when exposure is performed at the ordinary shutter speed and a second video signal when exposure is performed at the high shutter speed, a step of applying amplification processing to the first and second video signals, which are outputted by the photographic means, at two different amplification factors, in such a manner that the level of the first video signal will become approximately equal to the level of the second video signal, a step of obtaining a first integrated value by integrating one frame of the first video signal, a step of obtaining a second integrated value by integrating one frame of the second video signal, a step of calculating a difference between the first and second integrated values, and a step of adjusting at least one of the two different amplification factors in the amplification processing based upon the calculated difference in such a manner that the difference is eliminated.

In accordance with the present invention, the difference is calculated between a first integrated value of the video signal of a first image exposed at an ordinary shutter speed and an integrated value of a video signal of a second image, which is adjacent to the first image, exposed at a suitable shutter speed. On the basis of the difference calculated, at least one of two amplification factors for amplification processing of the first and second video signals is adjusted so as to eliminate the difference calculated.

When the difference between the first and second integrated values vanishes, the average level of the first video signal and the average level of the second video signal become equal. Regardless of any change in characteristics such as those of the circuit for amplifying the levels of the video signals, the average level of the first video signal and the average level of the second video signal become equal and an image printed based upon the second video signal is brightened.

It is preferred that exposure at the high shutter speed be performed one time in photography of a plurality of successive frames, the number of which is a multiple of six.

When a fluorescent lamp is lit by an alternating current having a repetition frequency of 50 Hz, the light-emission period is $1/100$ of a second. When the fluorescent lamp is lit by an alternating current having a repetition frequency of 60 Hz, the light-emission period is $1/120$ of a second. When photography is repeated at a shutter speed faster than $1/100$ of a second, the amount of integration of the video signal is different each time photography is performed and flicker is the result.

On the other hand, the period of photography in a video camera is $1/60$ of a second. Therefore, if photography is carried out every three fields, the amount of integration of the video signal each time photography is performed should be the same, and flicker should be prevented, even when photography is performed under illumination by a fluorescent lamp driven by an alternating current having a frequency of 50 or 60 Hz. However, the amount of light produced when a fluorescent lamp is discharged from right to left differs from that produced when the fluorescent lamp is discharged from left to right. Consequently, if photography is performed every six fields, the amount of integration of the video signal each time photography is performed will be the same and the effects of flicker will diminish.

Exposure at the high shutter speed is performed one time in a plurality of times, the number of which is a multiple of six. As a result, the amount of integration of the video signal each time high-speed photography is performed will be the same and the effects of flicker can be reduced.

A video camera according to a fifth aspect of the present invention comprises shutter implementing means for periodically repeating exposure performed at a first high shutter speed one time in a prescribed plurality of successive frames and exposure performed at an ordinary shutter speed at other times, photographic means for outputting a first video signal when exposure is performed at the ordinary shutter speed and a second video signal when exposure is performed at the first high shutter speed, an amplifier circuit for amplifying the first and second video signals, which are outputted by the photographic means, at mutually different amplification factors in such a manner that the average level of the second video signal will become approximately equal to the average level of the first video signal, first sensing means for sensing that the average level of the first video signal has fallen below a first threshold value, and first shutter control means responsive to sensing by the first sensing means for controlling the shutter implementing means in such a manner that the first high shutter speed will become a second shutter speed lower than the first high shutter speed but higher than the ordinary shutter speed.

The present invention further provides a method of controlling the above-described video camera.

According to the fifth aspect of the present invention, the first high shutter speed changes to a second high shutter speed lower than the first high shutter speed but higher than the ordinary shutter speed when the average level of the first video signal, which is obtained when photography is performed at the ordinary shutter speed, falls below the first threshold value.

When the brightness of the subject declines and the average level of the first video signal falls below the first threshold value, the first high shutter speed changes to a second high shutter speed lower than the first high shutter speed and exposure time is lengthened as a result. When the average level of the second video signal also rises and the second video signal is reproduced, a sharp image is obtained. Further, since the second shutter speed is higher than the ordinary shutter speed, this is suited to still playback as before and a blur-free reproduced picture is obtained.

Since photography at the first or second shutter speed is carried out only one time (e.g., one time in 16 fields or more) in a plurality of successive times, no unusual impression is given and a natural appearance is obtained even in movie playback.

It is preferred that photography at the high shutter speed be carried out one time in 60 frames or less, by way of example, so that photo opportunities will not be lost.

In an embodiment of the fifth aspect of the invention, a second threshold value lower than the first threshold value is established. When the average level of the first video signal falls below the second threshold value, the second high shutter speed is made a third shutter speed lower than the second high shutter speed but higher than the ordinary shutter speed.

By thus providing a second threshold value, a high shutter speed suitable for the purpose of obtaining a sharp reproduced image can be adjusted over a plurality of steps in conformity with the brightness of the subject. As a result, it is possible to accommodate various changes in the brightness of the subject so that a sharp reproduced image may be obtained.

The third shutter speed may be set to the ordinary shutter speed.

In another embodiment of the fifth aspect of the invention, a third threshold value lower than the second threshold value is set. When the average level of the first video signal falls below the third threshold value, a frame to be photographed at the high shutter speed is photographed at the ordinary shutter speed. Since the brightness of the subject is fairly low, photography of the frame for the purpose of still playback is no longer carried out.

A video camera according to a sixth aspect of the present invention comprises shutter implementing means for periodically repeating exposure performed at a high shutter speed one time in a prescribed plurality of successive frames and exposure performed at an ordinary shutter speed at other times, photographic means for outputting a first video signal when exposure is performed at the ordinary shutter speed and a second video signal when exposure is performed at the high shutter speed, an amplifier circuit for amplifying the first and second video signals, which are outputted by the photographic means, at mutually different amplification factors in such a manner that the average level of the second video signal will become approximately equal to the average level of the first video signal, brightness measuring means for measuring brightness of a subject, and shutter control means responsive to a change in brightness measured by the brightness measuring means for controlling the shutter implementing means in such a manner that the high shutter speed is changed continuously from a prescribed higher shutter speed to the ordinary shutter speed.

The invention further provides a method of controlling the above-described video camera.

According to the sixth aspect of the present invention, the brightness of the subject is measured and the shutter speed is changed continuously from a prescribed high shutter speed to the ordinary shutter speed in dependence upon a change in subject brightness. Therefore, even if the brightness of the subject declines, a second video signal for still reproduction resulting from photography at a comparatively large amount of exposure is obtained. A sharp still picture that is free of blurring and possesses suitable brightness may thus be obtained at all times.

The brightness of the subject can be found by measuring the average level of the first video signal obtained by exposing the subject at the ordinary shutter speed, just as in the case of the fifth aspect of the invention.

A video camera according to a seventh aspect of the present invention comprises shutter implementing means for periodically repeating exposure performed at a high shutter speed one time in a prescribed plurality of successive frames and exposure performed at an ordinary shutter speed at other times, photographic means for outputting a first video signal when exposure is performed at the ordinary shutter speed and a second video signal when exposure is performed at the high shutter speed, an amplifier circuit for amplifying the first and second video signals, which are outputted by the photographic means, at mutually different amplification factors in such a manner that the average level of the second video signal will become approximately equal to the average level of the first video signal, brightness measuring means for measuring brightness of a subject, and shutter control means, which in response to the fact that brightness measured by the brightness measuring means is below a prescribed level, is for controlling the shutter implementing means in such a manner that the high shutter speed will become the ordinary shutter speed.

The invention further provides a method of controlling the above-described video camera.

According to the seventh aspect of the present invention, the brightness of the subject is measured and the high shutter speed is set to the ordinary shutter speed when the measured brightness is lower than a prescribed level.

When the brightness of the subject is low and a suitable brightness cannot be obtained, exposure is performed at the ordinary shutter speed rather than at the high shutter speed. As a result, the level of the video signal also rises and a movie image possessing suitable brightness is obtained. Further, since photography at the high shutter speed for still playback is not carried out, a video signal not necessarily appropriate for still playback will not be produced. This makes it possible to prevent erroneous still playback.

In the embodiment of the fifth through seventh inventions, opening and closing of a diaphragm is controlled in dependence upon a change in subject brightness in such a manner that the average level of the first video signal and the average level of the second video signal are both maintained at prescribed levels, and the high shutter speed is slowed down only when the diaphragm is opened fully.

The amount of exposure can be adjusted by the diaphragm and the level of the video signal can be raised even if the brightness of the subject declines. Since the shutter speed is slowed down when the diaphragm is opened, exposure at the comparatively high shutter speed can be maintained until the diaphragm is opened. Accordingly, it is possible to accommodate even a comparatively fast-moving subject.

A video camera according to an eighth aspect of the present invention comprises shutter implementing means for periodically repeating exposure performed at a first high shutter speed one time in a prescribed plurality of successive frames and exposure performed at an ordinary shutter speed at other times, a diaphragm for limiting amount of incident light representing the image of a subject; photographic means for outputting a first video signal when exposure is performed at the ordinary shutter speed and a second video signal when exposure is performed at the first high shutter speed, an amplifier circuit for amplifying the first and second video signals, which are outputted by the photographic means, at mutually different amplification factors in such a manner that the average level of the second video signal will become approximately equal to the average level of the first video signal, brightness measuring means for measuring brightness of the subject, diaphragm control means for controlling opening and closing of the diaphragm, in dependence upon a change in the brightness measured by the brightness measuring means, in such a manner that the average level of the first video signal and the average level of the second video signal will both be maintained at prescribed levels, and gain control means which, in response to the diaphragm being opened fully on the basis of control by the diaphragm control means, controls the amplification factors of the amplifier circuit in such a manner that the average level of the first video signal and the average level of the second video signal will both be maintained at the prescribed levels.

According to the eighth aspect of the invention, the opening and closing of the diaphragm is controlled in response to a change in the brightness of the subject in such a manner that the average levels of the first and second video signals will be maintained at prescribed levels. After the diaphragm has been opened, the gain of the amplifier circuit is raised. Accordingly, the average levels of the first and second video signals are maintained at the prescribed levels at all times so that a bright reproduced image is obtained. Since the gain of the amplifier circuit is raised after the diaphragm has been opened, the gain of the amplifier circuit does not rise so much until the diaphragm is opened. As a result, the reproduced image obtained has a favorable S/N ratio and is bright.

In an embodiment of the eighth aspect of the invention, the video camera further comprises first sensing means for sensing that the average level of the first video signal is below a first threshold value, and first shutter control means responsive to sensing by the first sensing means for controlling the shutter implementing means in such a manner that the first high shutter speed will become a second high shutter speed lower than the first high shutter speed but higher than the ordinary shutter speed.

Thus, even if gain is raised to the limit of capability of the amplifier circuit, the level of the second video signal, whose level becomes particularly low, can be raised even in a case where the average level of the video signal does not reach the prescribed level. As a result, a bright and sharp reproduced image is obtained.

In another embodiment of the eighth aspect of the invention, the video camera further comprises print-inhibit signal superposing means for superposing a print inhibit signal, which represents inhibition of printing of an image represented by the video signal, in a vertical blanking interval associated with the first video signal among the video signals outputted by the photographic means, and means which, in response to the fact that the high shutter speed has become the ordinary shutter speed, is for controlling the print-inhibit signal superposing means in such a manner that the print inhibit signal will also be superposed in a vertical blanking interval associated with the second video signal.

The first video signal unsuited to still reproduction and the second video signal suited to still reproduction can be distinguished from each other by detecting the print inhibit signal at the time of playback. As a result, still reproduction is possible using the second video signal suited to still reproduction.

When the level of the first video signal falls below a second threshold value, the print inhibit signal is superposed also in the vertical blanking interval associated with the second video signal. Accordingly, when the high shutter speed becomes comparatively low and is now longer suitable for still reproduction, still reproduction can be inhibited by detecting the print inhibit signal.

A video camera according to a ninth aspect of the present invention comprises shutter implementing means for periodically repeating exposure performed at a first high shutter speed one time in a prescribed plurality of successive frames and exposure performed at an ordinary shutter speed at other times, photographic means for outputting a first video signal when exposure is performed at the ordinary shutter speed and a second video signal when exposure is performed at the first high shutter speed, an amplifier circuit for amplifying the first and second video signals, which are outputted by the photographic means, at mutually different amplification factors in such a manner that the average level of the second video signal will become approximately equal to the average level of the first video signal, flicker discriminating means for discriminating whether the difference between average levels of video signals representing two successive frames in the video signals amplified by the amplifier circuit is greater than a prescribed value and detecting that the difference is greater than the threshold value, thereby determining that flicker is caused in the video signal by illuminating light, and control means, which is responsive to the determination made by the flicker discriminating means that flicker is caused in the video signal by illuminating light, for controlling the shutter implementing means in such a manner that the first high shutter speed and the ordinary shutter speed in the shutter implementing means will become an identical shutter speed that corresponds to a positive whole-number multiple of the period of an AC power supply of a light source generating the illuminating light, and controlling the amplifier circuit in such a manner that the amplification factors of the amplifier circuit become identical with regard to the first and second video signals.

When a subject is illuminated by light that flickers, as in the manner of light from a fluorescent lamp, the brightness of the subject fluctuates so that there is a difference in brightness from one screen to the next. In other words, a difference develops between the average levels of two fields (or two frames) of a video signal representing an image of two successive frames.

Accordingly, by comparing the levels of the video signals representing an image of two successive frames, it is possible to determine whether the reproduced image is being affected by flickering illuminating light.

The frequency of flicker of an illuminating device such as a fluorescent lamp corresponds to the AC frequency of the commercial power supply. If it is assumed that a shutter speed (e.g., $\frac{1}{100}$ of a second) equivalent to a whole-number multiple of the period (e.g., $\frac{1}{50}$ of a second) of the commercial power supply, then the average level of the video signal representing the image of each frame will be constant and flickering of the reproduced image can be prevented.

According to the invention, and by virtue of the above-described technique, it is determined whether the subject is being influenced by flickering ascribable to light from a fluorescent lamp or the like. When it is judged that the subject is being affected by flicker, exposure is carried out at an identical shutter speed corresponding to a whole-number multiple of the period of the AC power supply. This means that the reproduced image will not flicker.

In an embodiment of the ninth aspect of the invention, the shutter speed corresponding to the positive whole-number multiple of the frequency of the AC power supply is a value lower than that of the high shutter speed but higher than that of the ordinary shutter speed.

This makes it possible to obtain a video signal capable of reproducing a blur-free, sharp still picture that is not affected by flicker.

In another embodiment of the ninth aspect of the invention, the video camera further comprises brightness measuring means for measuring brightness of the subject, and shutter control means, which is responsive to the fact that brightness of the subject measured by the brightness measuring means is below a prescribed level, for controlling the shutter implementing means in such a manner that the high shutter speed will become the ordinary shutter speed.

Since the brightness of the subject diminishes so that a video signal for still playback is not obtained, the video camera operates so as to provide only a video signal for a movie.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3a and 3b illustrate recording formats of an interval photography mode, in which FIG. 3a shows a case for field recording and FIG. 3b a case for frame recording;

FIG. 4a illustrates a video signal recorded by the interval photography mode, and FIG. 4b illustrates, in enlarged form, the vertical blanking interval of the video signal shown in FIG. 4a;

FIG. 5a illustrates an example of a PI signal, FIG. 5b an example of a PI signal and a PIL signal, FIG. 5c an example of an information signal and FIG. 5d an example of an ITS;

FIGS. 9a-1–9a-4 and 9b-1–9b-4 are time charts showing input and output signals of each block of the PI signal separating circuit, in which FIGS. 9a-1 through 9a-4 show a case in which a video signal that includes a PI signal enters the PI signal separating circuit and FIGS. 9b-1 through 9b-4 show a case in which broadcast waves enter the PI signal separating circuit;

DESCRIPTION OF THE PREFERRED EMBODIMENTS

First Embodiment

FIGS. 1 through 5 illustrate a first embodiment of a video camera according to the present invention.

Figure 1:
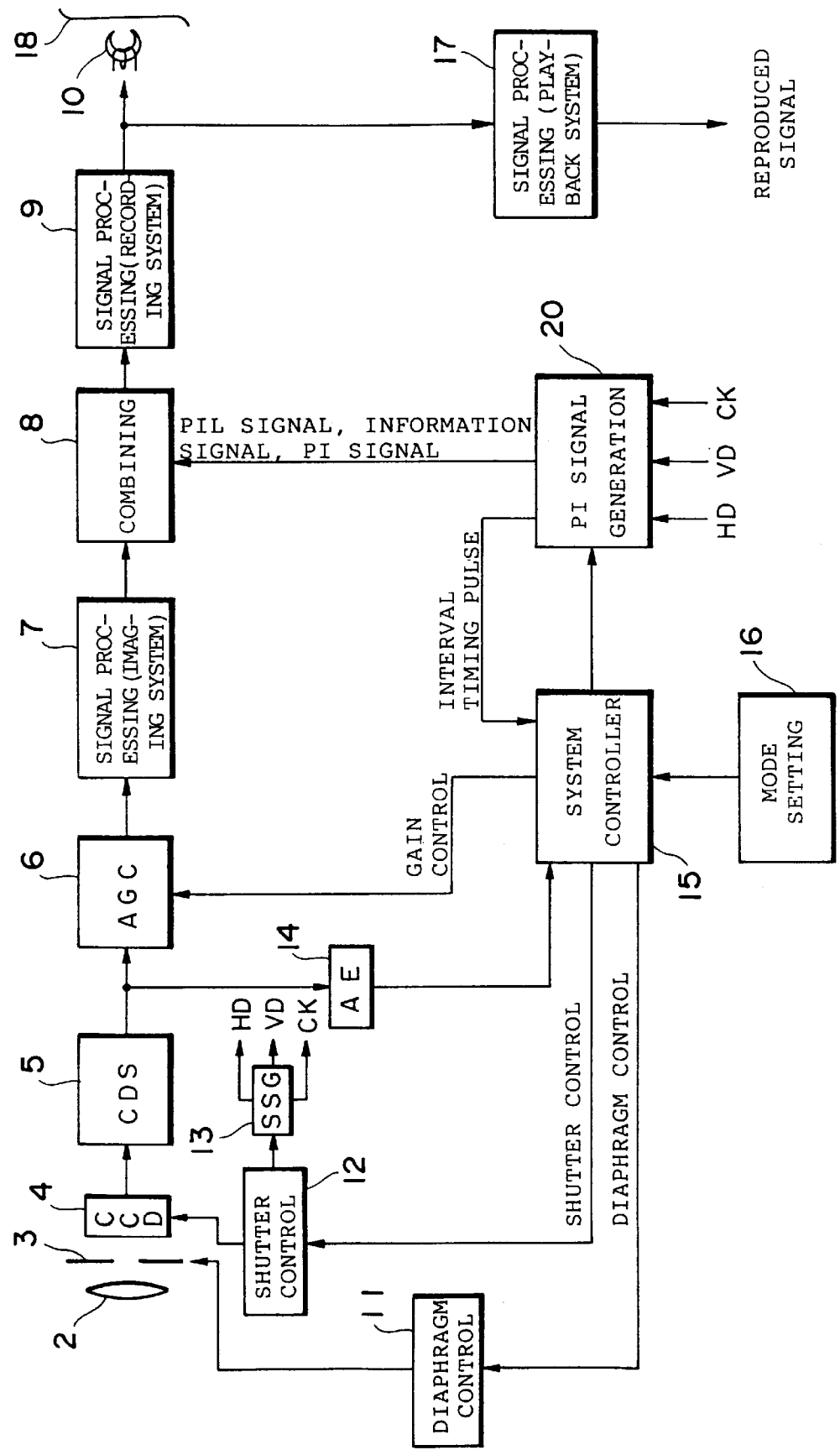
FIG. 1 is a block diagram illustrating the electrical configuration of a video camera according to a first embodiment of the present invention.
Figure 2:
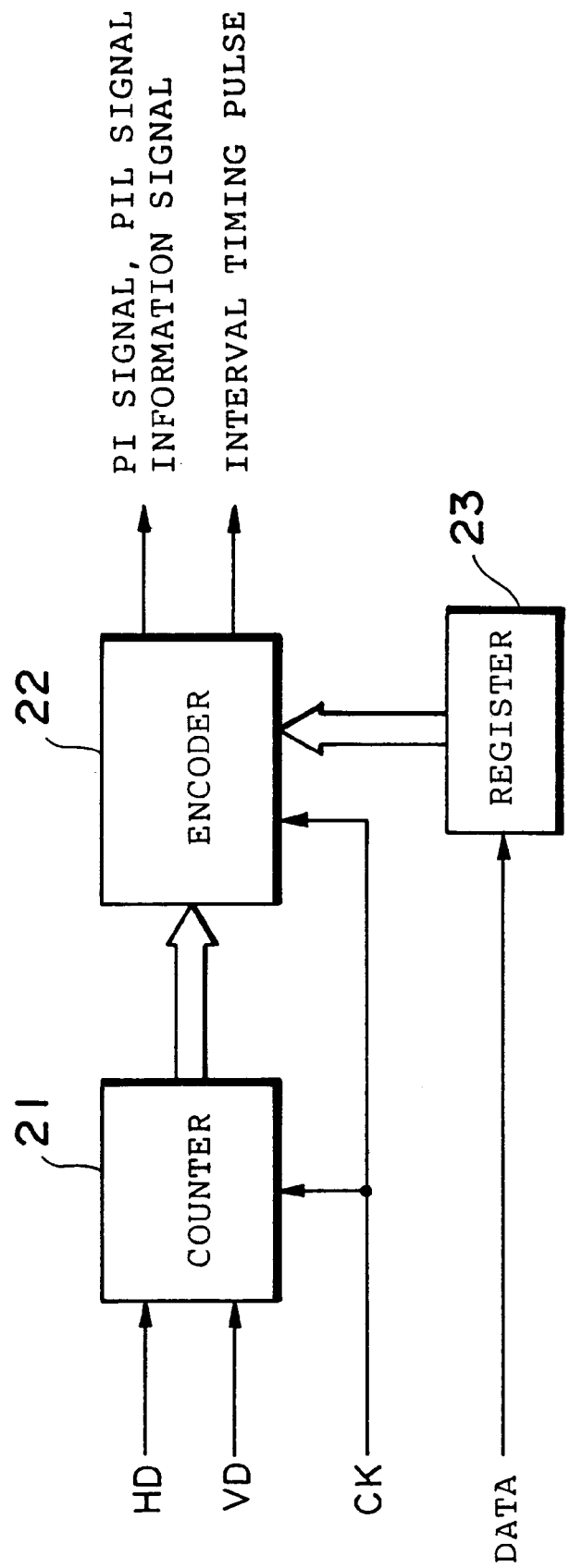
FIG. 2 is a block diagram illustrating the construction of a PI signal generating circuit.

FIG. 1 is a block diagram illustrating the electrical configuration of the video camera, and FIG. 2 is a block diagram illustrating the specific construction of a PI signal (print inhibit signal) generating circuit included in the video camera.

Figure 3A:
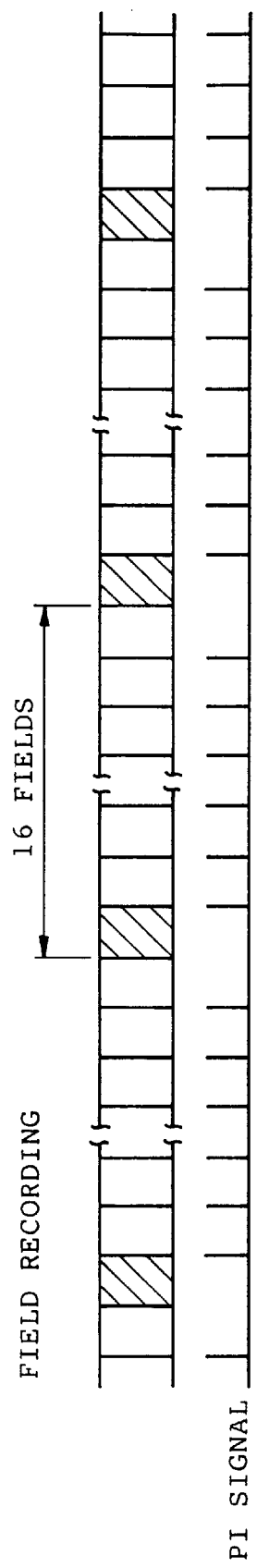
Figure 3B:
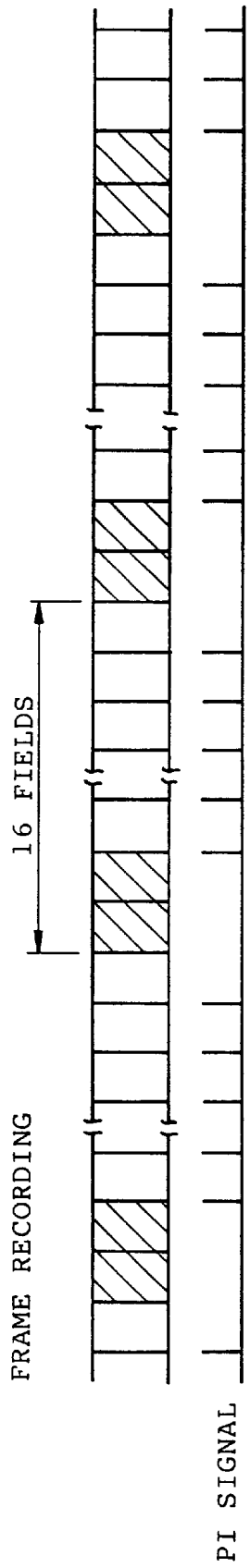
Figures 4A, 4B:
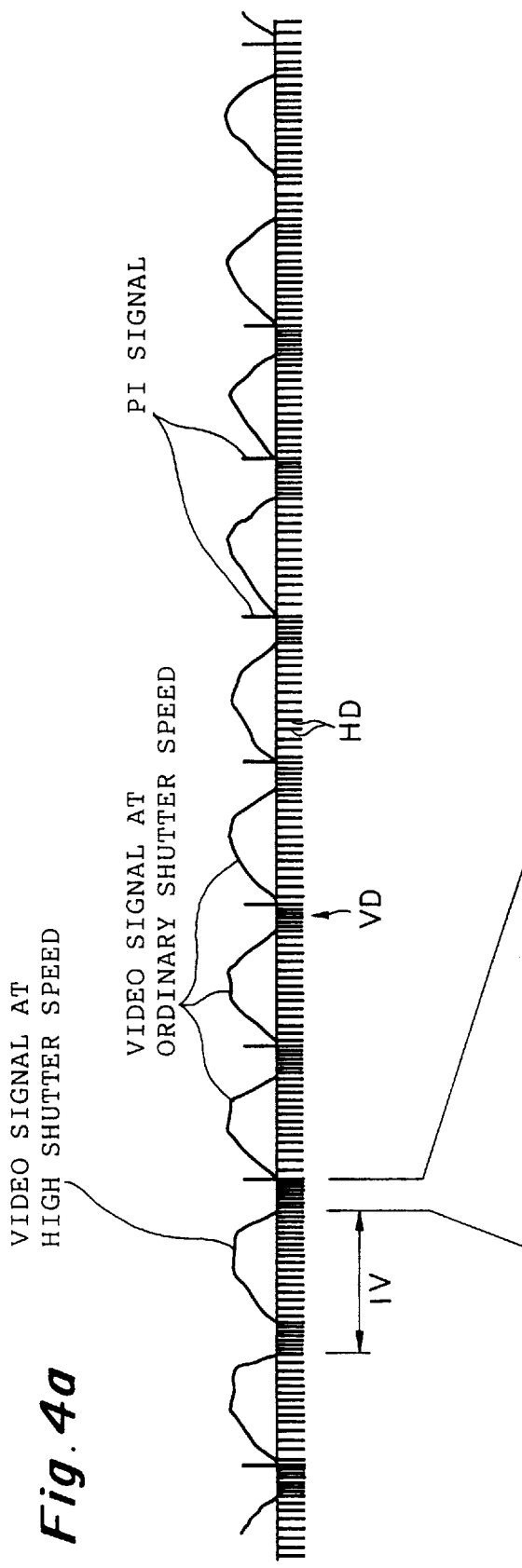

FIGS. 3a and 3b illustrate recording formats in the video camera illustrated in FIG. 1, in which FIG. 3a shows a case for field recording and FIG. 3b a case for frame recording. FIGS. 4a and 4b illustrate signals recorded in the video camera shown in FIG. 1, in which FIG. 4a shows a plurality of fields of a recording signal and FIG. 4b illustrates, in enlarged form, a vertical blanking interval in the recording signal of FIG. 4a. FIGS. 5a through 5d illustrate signals superposed in the vertical blanking interval of a video signal, in which FIG. 5a shows a PI signal that inhibits printing, FIG. 5b a PIL signal (which indicates that the next field of the video signal is capable of being printed) superposed on the last field of a plurality of successive fields in which PI signals are inserted, and a PI signal, FIG. 5c an information signal representing various information related to photography and printing, and FIG. 5d an example of an ITS (described later).

The video camera includes a mode setting button 16 which makes it possible to set a movie photography mode, an interval photography mode and a sports photography mode. The movie photography mode is the ordinary photography mode in which a subject is photographed continuously at a shutter speed of 1/60 of a second at all times. The interval photography mode is a mode in which a subject is photographed continuously over a prescribed plurality of fields at a shutter speed of 1/60 of a second, with photography being performed periodically at a high shutter speed (e.g., 1/250 of a second) in just one field (or one frame) among these plurality of fields. This sequence is performed in repeated fashion. The sports photography mode is a mode in which a subject is photographed continuously at a high shutter speed at all times.

A signal representing the mode set by the mode setting button 16 is applied to the system controller 15. On the basis of the entered mode setting signal, the system controller 15 outputs a shutter control signal to control a shutter control circuit 12, whereby photography conforming to each mode is carried out. In the description that follows, a case will be discussed in which the interval photography mode has been set by the mode setting switch 16.

A light image representing the image of a subject formed by an image pick-up lens 2 is acted upon by a diaphragm 3 controlled by a diaphragm control circuit 11, whereby the image of the subject is formed on a CCD 4.

In the interval photography mode, an electronic shutter operation is performed in the CCD 4 under the control of the shutter control circuit 12 in such a manner that the sequence comprising the continuous exposure over a prescribed plurality of times at the ordinary shutter speed of 1/60 of a second and the single exposure at the high shutter speed of 1/250 of a second is repeated. This operation is illustrated in FIGS. 3a and 3b, in which the hatched portions indicate fields in which photography is performed at the high shutter speed and the other portions indicate fields in which photography is performed at the ordinary shutter speed. FIG. 3a depicts field recording and FIG. 3b frame recording. In the case of frame recording, photography is carried out at the high shutter speed with regard to two successive fields in photography performed a plurality of times. High shutter-speed photography one time or two successive times is performed in 16 fields. It goes without saying that readout of the video signal from the CCD 4 is executed every 1/60 of second, just as in an ordinary video camera, without relation to the value of shutter speed.

As will be described later, a PI signal is superposed on the video signal obtained by photography at the ordinary shutter speed, this video signal being among those outputted by the CCD 4. The manner in which the PI signal is inserted also is shown in FIGS. 3a and 3b.

The video signal outputted by the CCD 4 is applied to an AGC (automatic gain control circuit) 6 and automatic exposure detecting circuit 14 via a CDS (correlated double-sampling circuit) 5.

The automatic exposure detecting circuit 14 extracts a luminance signal from the entering video signal, integrates the extracted luminance signal over a fixed time interval and applies the integrated signal to the system controller 15. On the basis of the integrated luminance signal provided by the automatic exposure detecting circuit 14, the system controller 15 outputs a diaphragm control signal to control the diaphragm in such a manner that the amount of exposure is rendered suitable at all times in the photography of ordinary shutter speed.

The automatic gain control circuit 6, whose amplification factor is changed over based upon a gain control signal from the system controller 15, is capable of amplifying the entering video signal at whichever of two amplification factors has been selected. The automatic gain control circuit 6 raises the amplification factor for the video signal obtained by photography at the high shutter speed so as to make it larger than the amplification factor for the video signal obtained by photography at the ordinary shutter speed, thereby performing an adjustment in such a manner that the average levels of the two kinds of video signals (the video signals outputted by the AGC circuit 6) will become approximately equal.

The video signals whose levels have thus been adjusted by the automatic gain control circuit 6 are applied to a signal processing circuit 7 for the image sensing system. The signal processing circuit 7 executes signal processing for generating R, G, B signals, adjusting the color balance of these signals, performing a gamma correction and producing a luminance signal and color-difference signals. Video signals resulting from this processing are applied to a combining circuit 8.

The video camera further includes a PI signal generating circuit 20. The latter is provided with a horizontal synchronizing signal HD, a vertical synchronizing signal VD and a clock signal CK from an SSG (synchronizing signal generating circuit) 13, and with data representing information relating to photography and information relating to printing, etc., from the system controller 15. On the basis of these input signals and data, the PI signal generating circuit 20 generates the PI signal, a PIL signal indicating that a PI signal is the last among PI signals which continue over a plurality of fields, information signals representing photographic information and printing information, and interval timing pulses that decide the period of photography at the high shutter speed. The interval timing pulses are applied to the system controller 15 and the PI signal, PIL signal and information signals are applied to the combining circuit 8.

The combining circuit 8 superposes the PI signal, PIL signal and information signals outputted by the PI signal generating circuit 20 on the video signals (at least the luminance signal) outputted by the signal processing circuit 7 for the image sensing system.

An example of the PI signal is shown in FIG. 5a, an example of the PIL signal is shown in FIG. 5b, and an example of an information signal is shown in FIG. 5c. Further, an example of an ITS inserted in a broadcast wave is shown in FIG. 5d. (The ITS, or "interface test signal", is a special signal inserted in the field blanking interval of a television signal.)

The PI signal illustrated in FIG. 5a is inserted in an initial interval $IT_1$ of a vertical blanking interval associated with the video signal obtained by performing photography at the ordinary shutter speed of 1/60 of a second. The PI signal is not inserted in a vertical blanking interval associated with the video signal obtained by performing photography at the high shutter speed.

The PI signal and PIL signal shown in FIG. 5b are inserted in the initial interval $IT_1$ of the vertical blanking interval associated with the video signal obtained by photography performed at the shutter speed of 1/60 of a second, one signal before the video signal obtained by photography at the high shutter speed. The combination of the PI signal and PIL signal indicates that printing will be inhibited because the video signal is one obtained by performing photography at the shutter speed of 1/60 of a second, and gives warning of the fact that the video signal, which has been obtained by performing photography at the high shutter speed at which printing is possible, will arrive. Since the PIL signal is merely for the purpose of giving warning, it need not always be attached to the PI signal.

The information signal of FIG. 5c is inserted in the interval other than the initial interval $IT_1$ of the blanking interval associated with the video signal obtained by photography performed at the high shutter speed. The information signal includes ID data (an information ID) indicating that the signal is an information signal. This is inserted in an interval $IT_2$ that is for identifying the information signal. The information represented by the information signal is composed of the fact that use was made of a shutter speed other than 1/60 of a second, the shutter speed, F number, color temperature, date prevailing at the time of photography, the title, whether the mode is the field or frame mode, the magnetic recording format (8 mm normal; 8 mm high; VHS; S-VHS, etc.), the frame number, etc. The ID data contained in this information is always inserted when any item of information has been inserted. With regard to the other information contained, one or a plurality of these items of information may be inserted as desired. Of course, in a case where such information is unnecessary in the printer apparatus, the information signal need not be inserted. Further, the information signal may be inserted not in the vertical blanking interval associated with the video signal obtained by performing photography at the high shutter speed but in a vertical blanking interval associated with the video signal obtained by performing photography at the ordinary shutter speed before or after the above-mentioned vertical blanking interval.

The ITS of FIG. 5d is inserted over the entirety of the vertical blanking interval.

The vertical blanking interval associated with the video signal preferably is a vertical blanking interval that appears immediately before this video signal.

Thus, the PI signal, PIL signal and information signal are superposed on the video signal in a form staggered with respect to time. By contrast, a portion of the ITS signal partially overlaps the PI signal, PIL signal and information signal in terms of time.

The PI signal, PIL signal and printing condition signal (information signal) are outputted by the PI signal generating circuit 20 at a time at which they will be superposed on the video signal between the 17th horizontal synchronizing signal and 18th horizontal synchronizing signal in the vertical blanking interval, as shown in FIG. 4b.

The video signal outputted by the combining circuit 8 is applied to a signal processing circuit 9 for the recording system. The video signal is subjected to recording processing such as pre-emphasis and frequency modulation processing by the processing circuit 9, after which the processed video signal is recorded on a video tape 18 by a recording/playback head 10.

The video camera shown in FIG. 1 can perform reproduction processing as well and includes a signal processing circuit 17 for the playback system.

In the playback mode, the video signal that has been recorded on the video tape 18 is read by a recording/playback head 10 and applied to a signal processing circuit 17 for the playback system. The signal processing circuit 17 delivers this signal to the exterior of the apparatus as a playback signal obtained by applying demodulating and de-emphasis processing to the signal that enters the circuit 17. For example, the resulting signal is applied to a printer apparatus, described later.

FIG. 2 is a block diagram showing the construction of part of the PI signal generating circuit 20.

The PI signal generating circuit 20 includes a counter 21, an encoder 22 and a register 23. The clock signal CK outputted by the SSG 13 is applied to the counter 21 and encoder 22, and the horizontal synchronizing signal HD and vertical synchronizing signal VD are applied to the counter 21. Data relating to photography and printing outputted by the system controller 15 is applied to the encoder 22 via the register 23.

The counter 21 includes a first counter for counting the horizontal synchronizing signal HD and a second counter for counting the vertical synchronizing signal VD. The value 17 is preset in the first counter. The second counter counts a value indicating the period (e.g., 16 fields) at which time photography is to be performed at the high shutter speed, counts a value that is smaller than this period by one, and repeats this counting operation at the above-mentioned period. When the above-mentioned period has been counted, the second counter generates a first signal and applies it to the encoder 22. When a value one smaller than this period has been counted, the second counter generates a second signal and applies it to the encoder 22.

On the basis of entry of the vertical synchronizing signal VD, the first counter of the counter 21 counts the horizontal synchronizing signal HD that enters from the beginning of the vertical blanking interval, detects the 17th horizontal synchronizing signal HD of the vertical blanking interval and applies a detection signal to the encoder 22. When the detection signal indicative of detection of the horizontal synchronizing signal enters, the encoder 22 generates the PI signal (FIG. 5a) if both the first signal and second signal are not entering from the second counter. Further, when the detection signal indicative of detection of the 17th horizontal synchronizing signal enters, the encoder 22 generates the PI signal and the PIL signal (FIG. 5b) if the second signal is entering from the second counter. Furthermore, when the detection signal indicative of detection of the 17th horizontal synchronizing signal enters, the encoder 22 encodes, by a prescribed method, the data provided by the register 23 to generate the information signal (FIG. 5c) if the first signal is entering from the second counter. The PI signal, PIL signal and information signal are applied to the combining circuit 8.

Further, in response to the first signal provided by the second counter, the encoder 22 outputs an interval timing pulse. The interval timing pulse is applied to the system controller 15. The latter responds to entry of the interval timing pulse by commanding the shutter control circuit 12 to operate at the high shutter speed in the next field.

The photographic period based upon the high shutter speed preferably has a range of from 16 to 60 fields. The reason for this is that if photography at the high shutter speed is performed one time in 16 fields, an unusual appearance will not occur when images are played back in the form of a movie. In case of photography at the high shutter speed performed one time in 60 fields, i.e., one time in one second, it is possible to avoid a situation in which a photo opportunity is lost.

Second Embodiment

FIGS. 6 to 9b illustrate an embodiment of a printer apparatus and PI signal separating (detecting) circuit according to the present invention.

Figure 6:
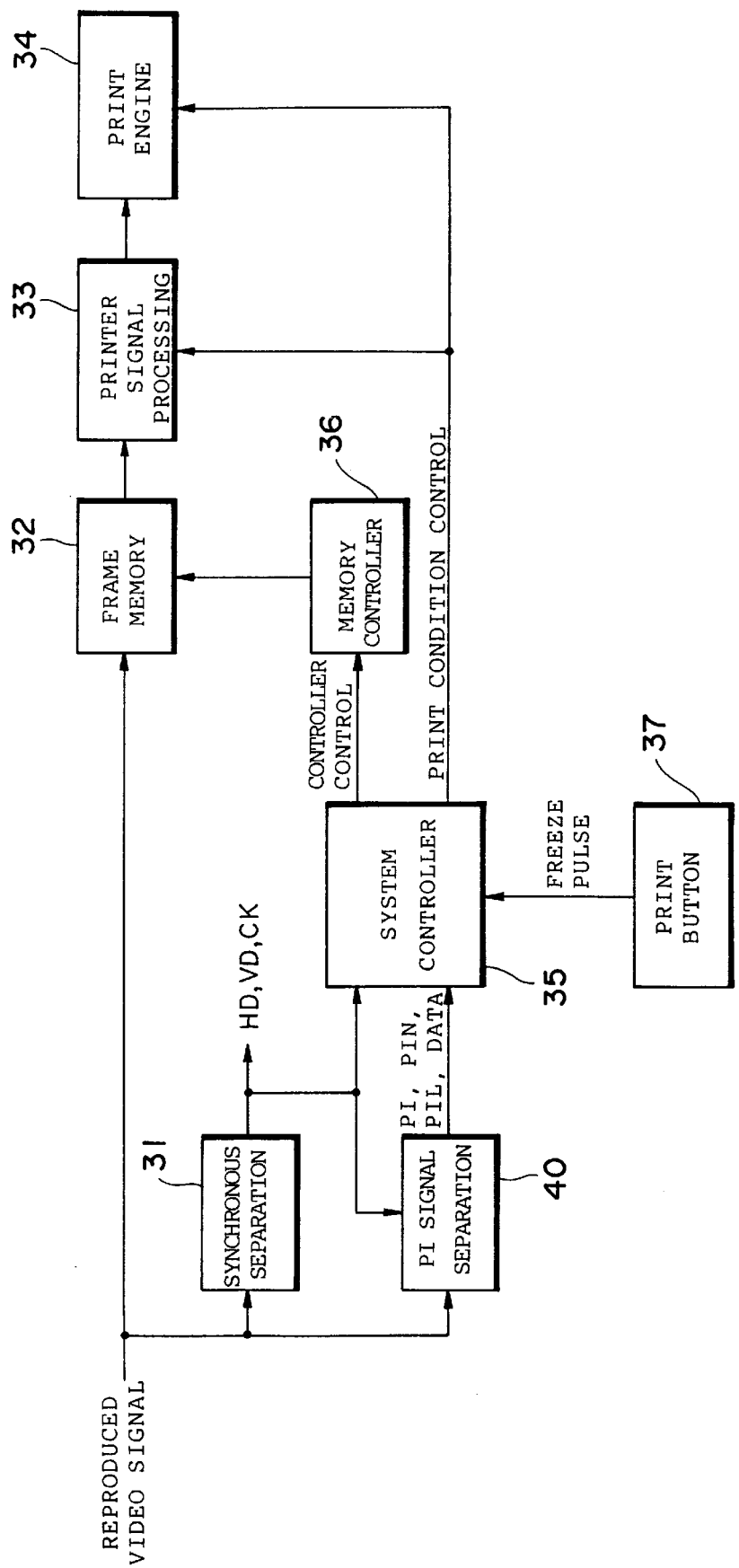
FIG. 6 is a block diagram illustrating the electrical configuration of a printer apparatus according to a second embodiment of the present invention.
Figure 7:
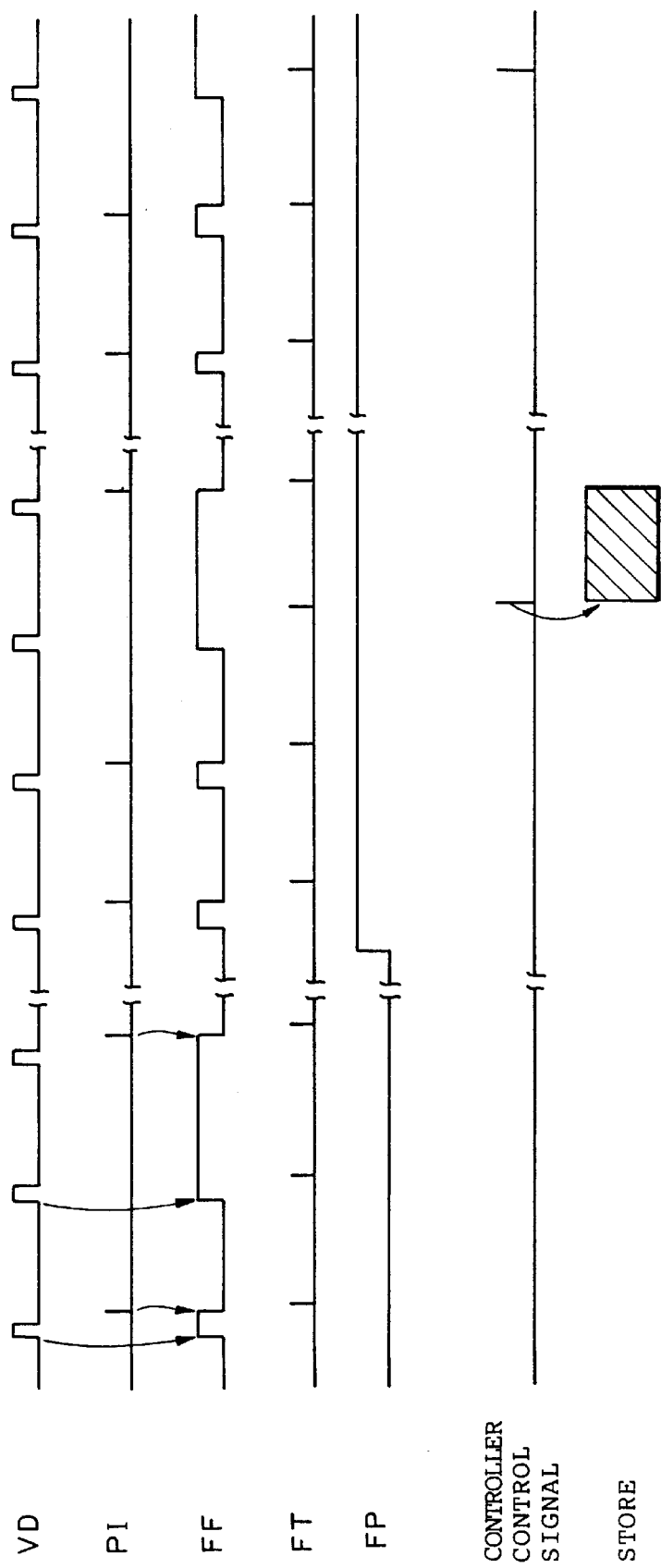
FIGS. 7a to 7g are timing charts showing input and output signals of each block of the printer apparatus.
Figure 8:
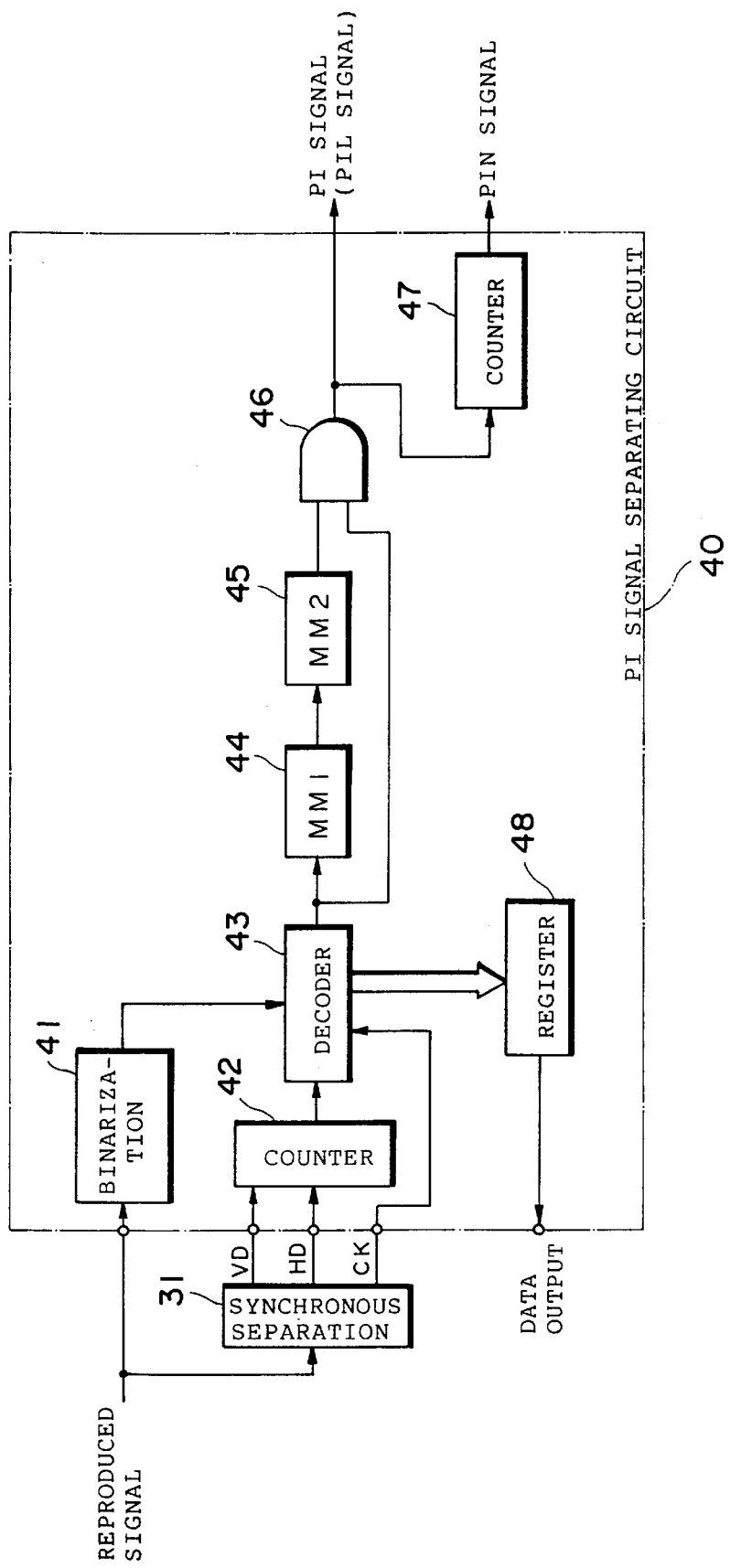
FIG. 8 is a block diagram showing the electrical configuration of a PI signal separating circuit.

FIG. 6 is a block diagram illustrating the electrical configuration of the printer apparatus, FIG. 7 is a time chart showing input and output signals of each circuit in the printer apparatus, FIG. 8 is a block diagram showing the electrical configuration of the PI signal separating circuit included in the printer apparatus of FIG. 6, and FIGS. 9a and 9b are time charts showing input and output signals of each circuit block of the PI signal separating circuit.

As shown in FIG. 6, a playback video signal obtained by being read from a video tape is applied to a synchronous separating circuit 31, a PI signal separating circuit 40 and a frame memory 32 in a printer apparatus.

The playback signal outputted by the video camera shown in FIG. 1 may be fed directly into the printer apparatus, a playback unit may be provided within the printer apparatus and a playback video signal read from a video tape loaded in the playback unit may be used, or use may be made of a playback video signal outputted by a separately provided playback unit.

The horizontal video signal HD, vertical synchronizing signal VD and clock signal CK are separated from the playback video signal by the synchronous separating circuit 31, and the separated horizontal video signal HD, vertical synchronizing signal VD and clock signal CK are applied to the PI signal separating circuit 40, a system controller 35, etc.

The PI signal separating circuit 40 extracts the PI signal, PIL signal and information signal, which have been superposed upon the vertical blanking interval of the entering playback video signal, from this video signal, applies these extracted signals to the system controller 35 and, when the PI signal has not been extracted, generates a PIN signal indicative of this fact and applies the PIN signal to the system controller 35.

When printing is performed, the playback video signal (this may be all frames of the playback video signal or solely the video signal obtained by photography at the high shutter speed) is applied to a monitor display unit (not shown) so that the image represented by the video signal may be shown on the monitor. While viewing images displayed on the monitor, the user finds the image desired to be printed. When the desired image has been found, the user presses a print button to apply a freeze pulse FP to the system controller 35.

The system controller 35 includes a flip-flop (not shown) set by the leading edge of the vertical synchronizing signal and reset by detection of the PI signal. If the PI signal is not detected, the output FF of the flip-flop is held at the H level. A freeze timing pulse FT is produced in the system controller 35. The pulse FT rises a fixed length of time after the vertical synchronizing signal VD rises (the pulse rise is also later than the timing at which the flip-flop is reset by the PI signal).

The system controller 35 takes the logical product of the flip-flop output FF, the freeze timing pulse FT and the freeze pulse FP, and the result of this operation is applied to a memory controller 36 as a controller control signal (see FIG. 7).

When the controller control signal is applied to the memory controller 36, the latter applies a memory write signal to a frame memory 32 so that the playback video signal that enters immediately thereafter will be written in the frame memory 32. Thus, after the print button 37 is pressed, the first appearing video signal obtained by photography at the high shutter speed is stored in the frame memory 32.

The memory controller 36 outputs the memory write signal only when the initial controller control signal has been applied thereto. Thenceforth, even when the controller control signal is applied, the memory controller 36 will not issue the memory write signal until printing operation ends or until the freeze pulse FP is again provided by pressing the print button 37 again.

Though an A/D converter circuit is not shown in FIG. 6, it goes without saying that if the playback video signal is an analog signal, the video signal will be stored in the frame memory 32 after being converted into digital data. When the video signal obtained by photography at the high shutter speed is in the field mode, one field of image data is written in the frame memory 32. When this video signal is in the frame mode, two successive fields of the image data are written in the memory 32.

The image data stored temporarily in the frame memory 32 is applied to a printer-signal processing circuit 33, which subjects this data to signal processing in accordance with control based upon the print-condition control signal and applies the resulting signal to a print engine 34. The signal outputted by the print engine 34 is applied to a thermal head (not shown) so that the image represented by the video signal stored in the frame memory 32 will be printed to obtain a printed picture.

An arrangement may be adopted in which the system controller 35 outputs the controller control signal based upon the PIN signal outputted by the PI signal separating circuit 40. In such case it will be unnecessary to provide the system controller 35 with the above-mentioned flip-flop.

Further, in response to the PIL signal provided by the PI signal separating circuit 40, the system controller 35 is capable of applying a print-preparation command to the memory controller 36, printer-signal processing circuit 33 and print engine 34, etc. The PIL signal appears one field earlier than the video signal obtained by the photography at the high shutter speed. Consequently, the memory controller 36, printer-signal processing circuit 33 and print engine 34, after being provided with the PIL signal, are capable of being provided with a preparation time of at least one field interval with regard to storage of the video signal, which has been obtained by photography at the high shutter speed, in the memory, signal processing of this signal and the operation for printing the signal. Accordingly, it is possible to utilize circuitry having a slow speed of response. With regard to the system controller 35 also, the PIN signal enters (or the PI signal does not enter) upon passage of one field interval following entry of the PIL signal. As a result, the preparation interval up to output of the memory write signal and print command, etc., can be secured based upon the PIN signal (or cessation of the PI signal).

The data signal applied to the system controller 35 from the PI signal separating circuit 40 is used in various applications. The data signal represents information related to photography and printing, as set forth above. In this information, the frame number, for example, is applied to the display unit and is displayed along with the image. While viewing this display, the user is capable of pressing the print button 37 when the image having the designated frame number appears. Alternatively, if a frame number has been entered from a keyboard (not shown) in advance, control can be performed in such a manner that only the video signal associated with this frame number is stored in the frame memory 32. Thus, a video signal desired to be printed can be specified by a variety of such methods using a frame number.

Field/frame data indicates whether a video signal is a field-mode video signal or a frame-mode video signal. Therefore, the writing of image data in the frame memory 32 can be controlled based upon this data.

Shutter speed, F number, color temperature, date and title, etc., are useful in creating a printed picture. The print-condition control signal is created from this data and is applied to the printer-signal processing circuit 33 and print engine 34. As a result, it is possible to create a printed picture of excellent quality at all times, and the date, title, etc., can be entered on the printed picture whenever desired.

In the embodiment set forth above, only a specific video signal designated for printing is written in the frame memory 32. However, it is possible to adopt an arrangement in which all video signals obtained by photography at the high shutter speed are written successively in the frame memory 32 (a video signal written in the memory 32 previously is erased by writing in a new video signal), with writing of video signals in the memory 32 being halted upon entry of a freeze pulse indicating that printing is to be carried out. Thus, one frame of image data written in the frame memory 32 last remains in the frame memory 32. In this case, display of the image can be performed based upon the data that has been stored in the frame memory 32.

Processing for detecting the PI signal, PIL signal and print-condition data and processing for generating the PIN signal will be described with reference to FIG. 8 and FIGS. 9a, 9b. FIG. 9a is a time chart for a case in which a playback signal of a video signal obtained in the interval photography mode is fed into the PI signal separating circuit 40, and FIG. 9b is a time chart for a case in which a video signal of an ordinary broadcast wave is fed into the PI signal separating circuit 40.

The ITS is inserted in the vertical blanking interval of the ordinary broadcast wave. The ITS is inserted in the vertical blanking intervals of all fields and is not periodically absent as in the manner of the PI signal. Even if a broadcast wave in which the ITS has been inserted in the vertical blanking interval enters, the PI signal separating circuit 40 distinguishes the ITS signal and is capable of detecting the PI signal correctly.

The PI signal separating circuit 40 is provided with the playback video signal and with the horizontal synchronizing signal HD, vertical synchronizing signal VD and clock signal CK extracted by the synchronous separating circuit 31.

The playback video signal fed into the PI signal separating circuit 40 is applied to a binarizing circuit 41, whereby the signal is converted into binary data. The binary data is applied to a decoder 43. The threshold level of the binarizing circuit 41 is set at a level at which the PI signal, PIL signal and information signal can be binarized.

Among the signals that enter the PI signal separating circuit 40, the vertical synchronizing signal VD and horizontal synchronizing signal HD are applied to a counter 42 and the clock signal CK is applied to the decoder 43.

The counter 42 counts the horizontal synchronizing signal HD that follows the start of the vertical blanking interval and outputs a detection signal to the decoder 43 in response to detecting the 17th horizontal synchronizing signal.

Upon entry of this detection signal, the decoder 43 accepts the binary signal provided by the binarizing circuit 41 and distinguishes between the PI signal (and PIL signal) and the information signal. The decoder 43 provides a first monostable multivibrator 44 and an AND gate 46 with data (any one of the PI signal, PIL signal or ITS) that enters from the binarizing circuit 41 in the initial interval $IT_1$ of one horizontal scanning interval in which the PI signal and PIL signal have been superposed. Further, the decoder 43 judges whether the initial interval $IT_1$ has data or not and compares data in the interval $IT_2$, which is for identifying the information signal, with predetermined ID data. If the result of the comparison is that the data in the interval $IT_2$ for identifying the information signal agrees with the ID data, the signal is judged to be the information signal. When this is the case, the read data is applied to a register 48. If the data is the ITS or the like and not an information signal, then this data is not applied to the register 48.

The data that enters the register 48 is fed into the system controller 35 from the PI signal separating circuit 40 and is used in various applications, as set forth above.

The first monostable multivibrator 44 has a time constant on the order of 1.1 V (where V is one vertical scanning interval).

The first monostable multivibrator 44 makes a transition to the unstable state (at which its output attains the H level) in response to an input pulse signal and then reverts to the stable state (at which its output attains the L level) upon elapse of a period of time equivalent to 1.1 V. In a case where the signal that enters the PI signal separating circuit 40 is a video signal obtained in the interval photography mode, the PI signal (and PIL signal) outputted by the decoder 43 is absent once or twice at a fixed period. When the first monostable multivibrator 44 makes a transition to the unstable state in response to the PI signal (and PIL signal) and the PI signal enters again before elapse of the time 1.1 V, the output of the multivibrator 44 continues to be held at the H level. However, the output falls to the L level if the PI signal does not enter over a period of time equal to or greater than 1.1 V. When the video signal obtained in the interval photography mode has entered, the output of the first monostable multivibrator 44 falls to the L level at a fixed period.

By contrast, when a broadcast wave has entered, the signal component of ITS always enters the first monostable multivibrator 44 before the time period of 1.1 V elapses. Accordingly, the first monostable multivibrator 44 attains the unstable state and is maintained at the H level at all times.

The output of the first monostable multivibrator 44 enters a second monostable multivibrator 45. The latter makes a transition to the unstable state (at which is output attains the H level) in response to the trailing edge of the input pulse signal and reverts to the stable state (at which its output falls to the L level) when time equivalent to 65 V elapses.

In the case of the video signal obtained in the interval photography mode, the output of the first monostable multivibrator 44 assumes the L level at a fixed period. Accordingly, the second monostable multivibrator 45 assumes the unstable state and its output is held at the H level.

When the broadcast wave has entered the PI signal separating circuit 40, the output of the first monostable multivibrator 44 is at the H level at all times. Accordingly, since the input pulse signal does not decay within the time period of 65 V, the stable state is attained at all times and the L level is maintained in the monostable multivibrator 45.

The output of the second monostable multivibrator 45 enters the AND gate 46.

When the video signal obtained in the interval photography mode has entered the PI signal separating circuit 40, the output of the second monostable multivibrator 45 will always be at the H level and therefore the PI signal (and PIL signal) outputted by the decoder 43 will pass through the AND gate 46. As a result, the PI signal (and PIL signal) obtained in the interval photography mode can be separated by the PI signal separating circuit 40.

When the broadcast wave has entered the PI signal separating circuit 40, the output of the second monostable multivibrator 45 will always be at the L level and therefore the signal component of the ITS outputted by the decoder 43 will not pass through the AND gate 46. Accordingly, the PI signal (and PIL signal) obtained in the interval photography mode and the broadcast wave can be distinguished by the PI signal separating circuit 40 and it is possible to output only the PI signal (and PIL signal). Further, the PI signal outputted by the AND gate 46 is applied also to a counter 47. The latter is preset to a value representing the period at which the video signal obtained by photography at the high shutter speed appears (the aforesaid value expresses the period in the form of the number of vertical scanning intervals). The value of the count in the counter 47 is decremented whenever the PI signal enters, and the counter 47 issues the PIN signal when the value of the count becomes zero. The value representing the aforementioned period is then preset in the counter 47 again.

Third Embodiment

Figure 10:
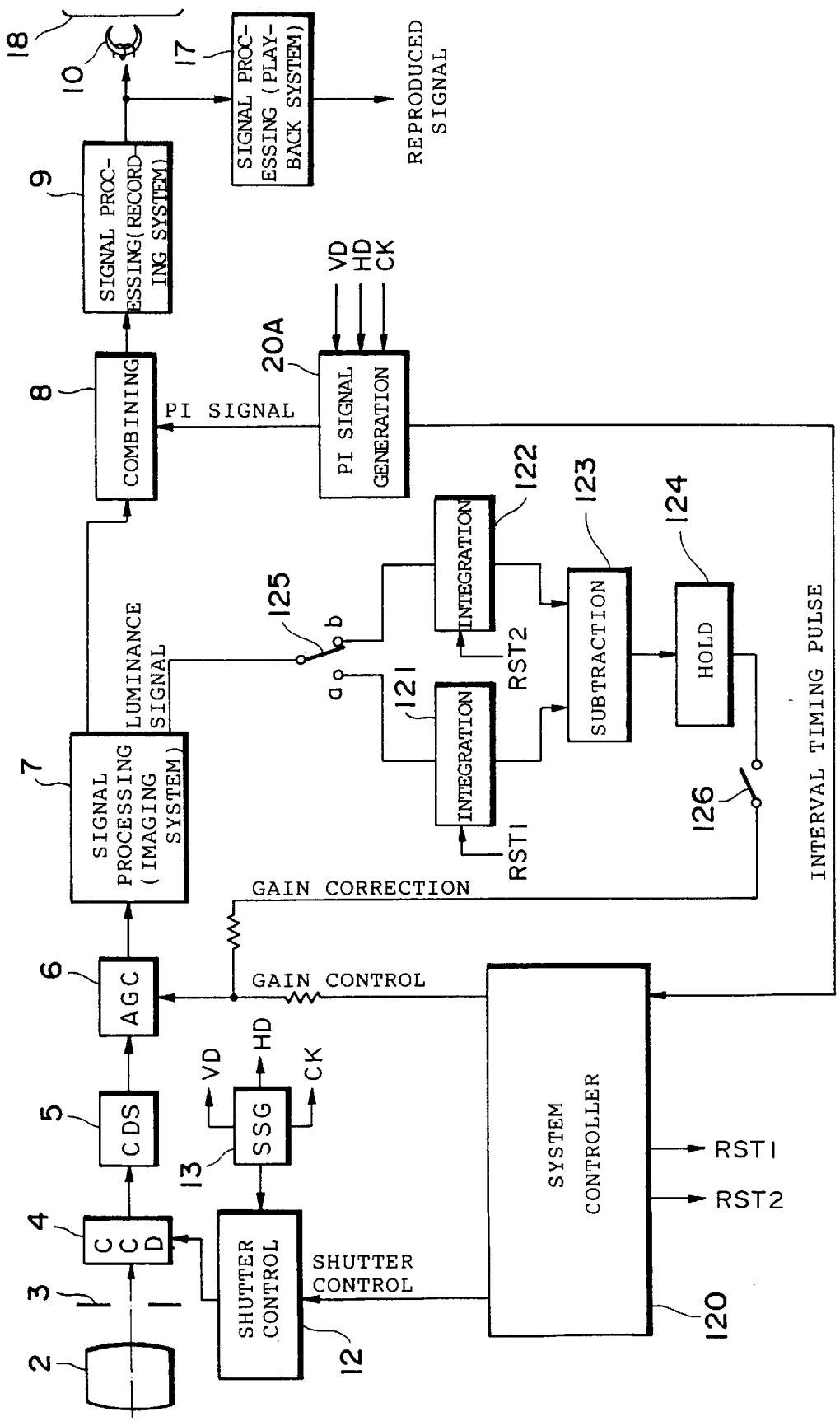
FIG. 10 is a block diagram illustrating the electrical configuration of a video camera according to a third embodiment of the present invention.
Figure 11:
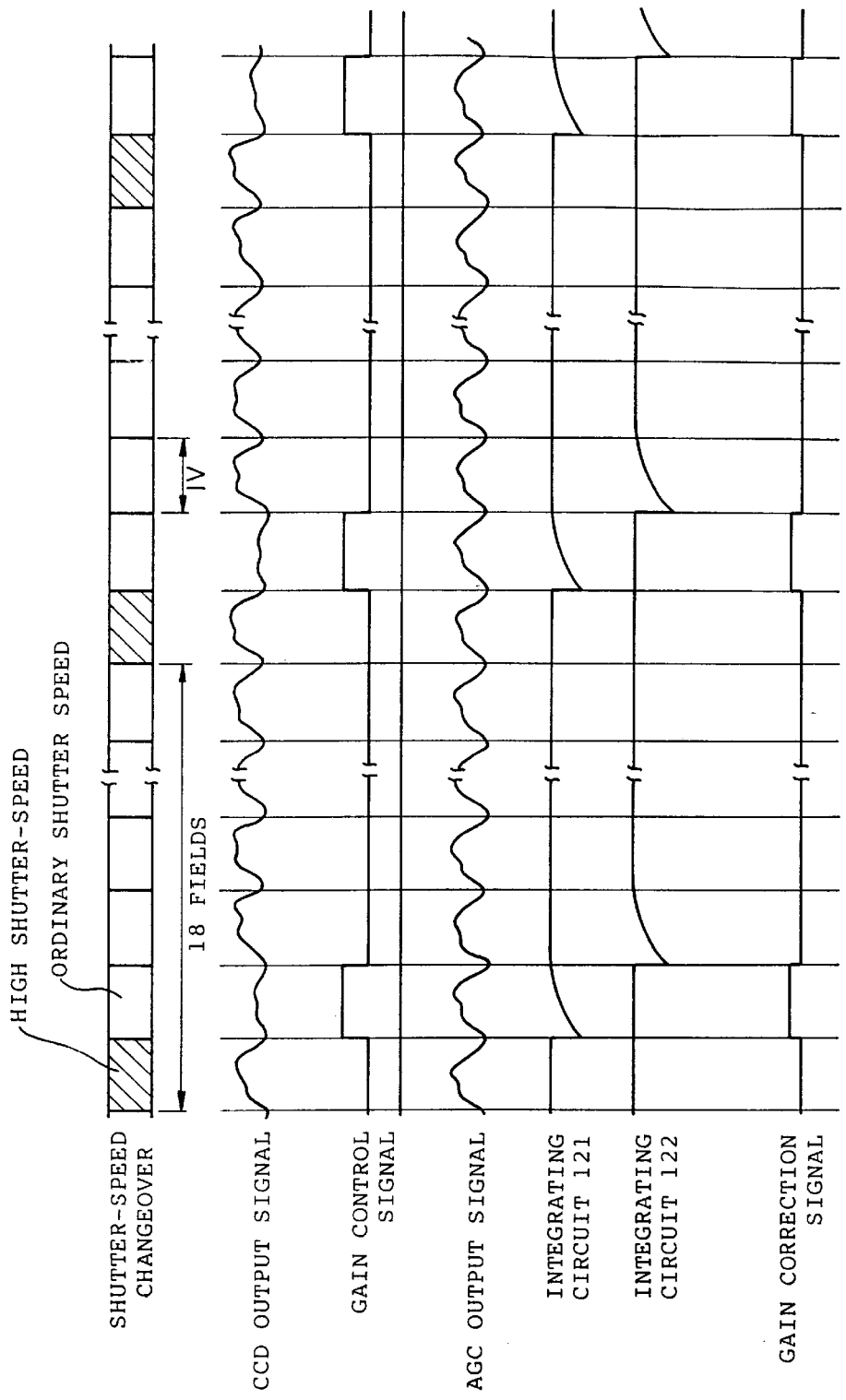
FIGS. 11a–11g are time charts showing the operation of the video camera depicted in FIG. 10.

FIG. 10, which is for describing a third embodiment of the invention, is a block diagram illustrating the electrical configuration of a video camera according to this embodiment. FIG. 11 is a time chart showing operation when photography is performed using the video camera depicted in FIG. 10.

Figure 12:
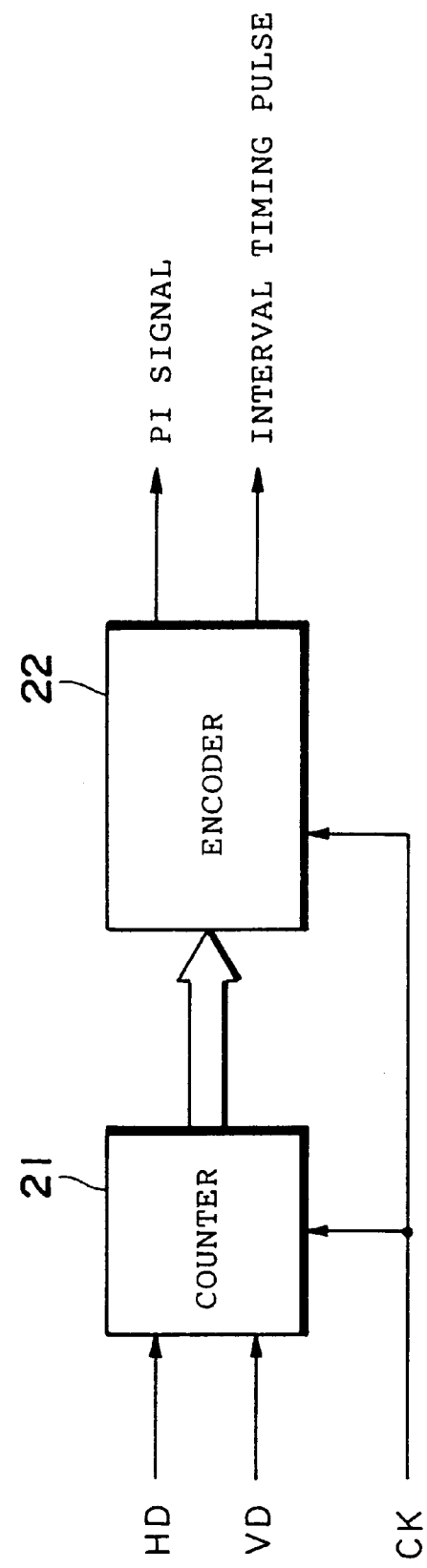
FIG. 12 is a block diagram showing the construction of a PI signal generating circuit.

FIG. 12 is a block diagram showing the specific construction of a PI signal generating circuit included in the video camera.

Figure 13:
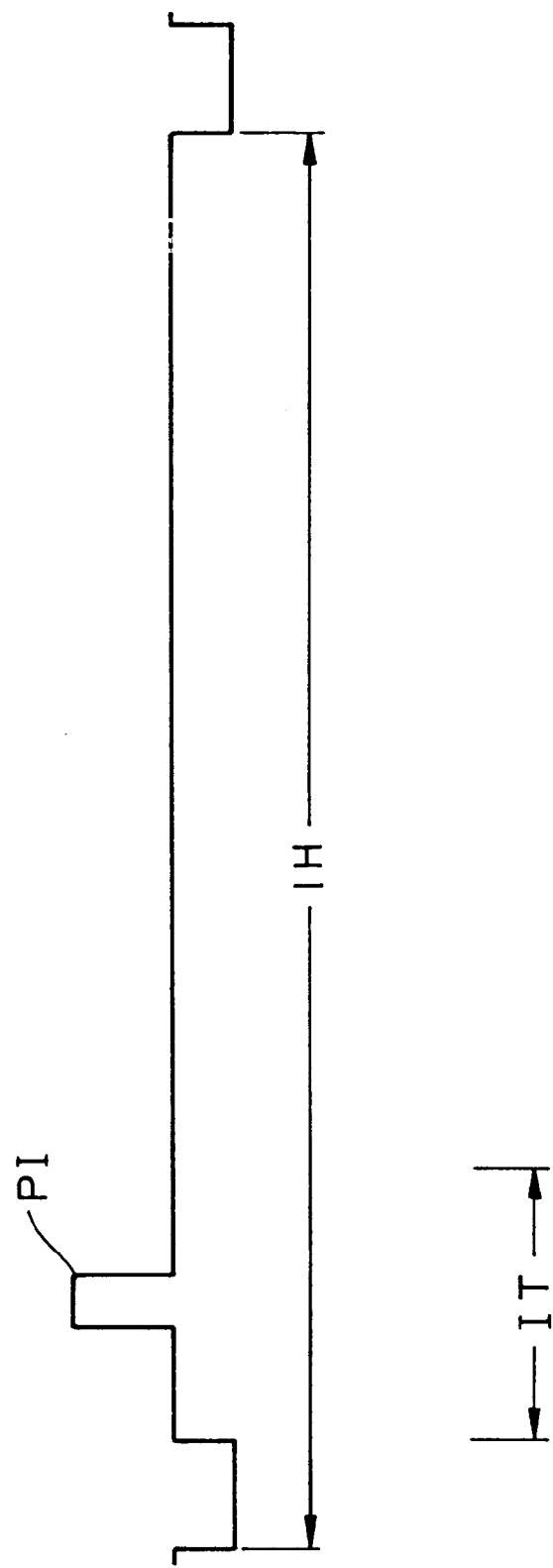
FIG. 13 is a waveform diagram showing an example of a PI signal superposed upon a video signal.

FIG. 4a, which illustrates the signal recorded in the video camera, is effective unchanged in this embodiment as well. FIG. 13 illustrates the PI signal that inhibits printing and corresponds to FIG. 5a. The video camera performs photography of a subject continuously over a prescribed plurality of fields (the number of which preferably is a multiple of six, such as 12 fields, 18 fields, etc.) at a shutter speed of 1/60 of a second, with photography being performed periodically at a high shutter speed (e.g., 1/250 of a second) in just one field (or one frame) among these plurality of fields.

Since photography is performed at the high shutter speed one time periodically in the number of which is a multiple of six, the reproduced image is prevented from being affected by the flickering of a fluorescent lamp or the like. The reasons for this will be described later.

A light image representing the image of a subject formed by the image pick-up lens 2 is acted upon by the diaphragm 3, whereby the image of the subject is formed on the CCD 4.

An electronic shutter operation is performed in the CCD 4 under the control of the shutter control circuit 12 in such a manner that the sequence comprising the continuous exposure over a prescribed plurality of times at the ordinary shutter speed of 1/60 of a second and the single exposure at the high shutter speed of 1/250 of a second is repeated. This operation is illustrated at the top of FIG. 11, where the hatched portions indicate fields in which photography is performed at the high shutter speed and the other portions indicate fields in which photography is performed at the ordinary shutter speed. Photography is performed at the high shutter speed one time in 18 fields. It goes without saying that readout of the video signal from the CCD 4 is executed every 1/60 of second, just as in an ordinary video camera, without relation to the value of shutter speed.

As will be described later, a PI signal is superposed on the video signal obtained by photography at the ordinary shutter speed, this video signal being among those outputted by the CCD 4.

The video signal outputted by the CCD 4 is applied to the automatic gain control circuit 6 via the CDS (correlated double-sampling circuit) 5.

The automatic gain control circuit 6, whose amplification factor is changed based upon a gain control signal from a system controller 120, is capable of amplifying the entering video signal at whichever of two amplification factors has been selected. The automatic gain control circuit 6 raises the amplification factor that is for the purpose of amplifying the video signal obtained by photography at the high shutter speed so as to make it larger than the amplification factor that is for the purpose of amplifying the video signal obtained by photography at the ordinary shutter speed, thereby performing an adjustment in such a manner that the average levels of the two video signals will become approximately equal. For example, if the amplification factor prevailing at the time of the ordinary shutter speed (1/60 of a second) is A, then a gain control signal that will make the amplification factor prevailing when the shutter speed is 1/250 of a second equal to A·(250/60) will be applied to the circuit 6.

The video signals whose levels have thus been adjusted by the automatic gain control circuit 6 are applied to the signal processing circuit 7 for the image sensing system. The signal processing circuit 7 subjects the video signals to signal processing for adjusting the color balance of these signals and performing a gamma correction, and generates a luminance signal and color-difference signals. The signals obtained by this processing are applied to the combining circuit 8.

The video camera further includes a PI signal generating circuit 20A. The latter is provided with a horizontal synchronizing signal HD, a vertical synchronizing signal VD and a clock signal CK from the SSG (synchronizing signal generating circuit ) 13. On the basis of these input signals, the PI signal generating circuit 20A generates the PI signal as well as interval timing pulses that decide the period of photography at the high shutter speed. The interval timing pulses are applied to the system controller 120 and the PI signal is applied to the combining circuit 8.

The combining circuit 8 superposes the PI signal outputted by the PI signal generating circuit 20A on the video signals (at least the luminance signal) outputted by the signal processing circuit 7 for the image sensing system.

An example of the PI signal is shown in FIG. 13.

The PI signal illustrated in FIG. 13 is inserted in an initial interval IT of a vertical blanking interval associated with the video signal obtained by performing photography at the ordinary shutter speed of 1/60 of a second. The PI signal is not inserted in a vertical blanking interval associated with the video signal obtained by performing photography at the high shutter speed.

The vertical blanking interval associated with the video signal preferably is a vertical blanking signal that appears immediately ahead of this video signal.

The PI signal is outputted by the PI signal generating circuit 20A at a timing at which it will be superposed upon the video signal between the 17th and 18th horizontal synchronizing signals in the vertical blanking interval, as shown in FIG. 4b.

The video signal outputted by the combining circuit 8 is applied to the signal processing circuit 9 for the recording system. The video signal is subjected to recording processing such as pre-emphasis and frequency modulation processing by the processing circuit 9, after which the processed video signal is recorded on the video tape 18 by the recording/playback head 10.

The video camera shown in FIG. 10 can perform reproduction processing as well and includes the signal processing circuit 17 for the playback system. This circuit is identical with that described earlier in connection with the first embodiment.

The luminance signal produced in the processing circuit 7 for the image sensing system is applied to a first integrating circuit 121 or a second integrating circuit 122 via a changeover switch 125. The first integrating circuit 121 and the second integrating circuit 122, which are reset respectively by reset signals RST1 and RST2 provided by the system controller 120, integrate the equivalent of one image portion of the luminance signal. The video camera illustrated in FIG. 10 integrates one field of the luminance signal owing to field photography. However, if the video camera performs frame photography, one frame of the luminance signal will be integrated.

In the field in which the luminance signal obtained by photography at the high shutter speed is being outputted by the signal processing circuit 7 for the image sensing system, the changeover switch 125 is changed over so as to be connected to the side of an a terminal. In the next field (a field in which the luminance signal obtained by photography at the ordinary shutter speed is outputted), the changeover switch 125 is changed over so as to be connected to the side of an b terminal. In other fields the changeover switch 125 is not connected to either the a or the b terminal. One field of the luminance signal obtained by photography at the high shutter speed is integrated by the first integrating circuit 121. One field of the luminance signal obtained by photography at the ordinary shutter speed, which luminance signal is that of a frame contiguous in time to a frame represented by the luminance signal integrated by the first integrating circuit 121, is integrated by the second integrating circuit 122.

A first integrated value resulting from integration performed by the first integrating circuit 121 and a second integrated value resulting from integration performed by the second integrating circuit 122 are applied to a difference calculating circuit 123. The latter is a circuit for calculating difference data between the first and second integrated values applied thereto. The difference data calculated in the difference calculating circuit 123 is applied to a holding circuit 124, which holds the data temporarily.

The difference data held in the holding circuit 124 is read out of this circuit in response to a switch circuit 126 being turned on. The switch circuit 126 is turned on during the field in which the video signal obtained by photography at the high shutter speed enters the AGC 6.

In response to the switch circuit 126 turning on, the difference data is outputted by the holding circuit 124 and is added, as a gain correction signal (e.g., a voltage signal) to the gain control signal delivered by the system controller 120, and the resulting signal is applied to the AGC 6 as a control signal. The magnification factor of the AGC 6 is changed in conformity with the control signal (the voltage signal) resulting from the addition operation.

The characteristic of the AGC 6 changes slightly owing to aging and variations in temperature. As a consequence, merely changing over the amplification factor by the gain control signal provided by the system controller 120 does not necessarily mean that equivalence will always be established between the amplified level of the video signal obtained by photography at the high shutter speed and the amplified level of the video signal obtained by photography at the ordinary shutter speed. With the video camera illustrated in FIG. 10, the gain control signal applied to the AGC 6 is corrected in such a manner that the difference between one field of the integrated value of the video signal obtained by photography at the high shutter speed and one field of the integrated value of the video signal obtained by photography at the ordinary shutter speed, namely the integrated values of the video signals representing images contiguous in terms of time, will be eliminated, i.e., in such a manner that these integrated values of the video signals will be equalized. Accordingly, irrespective of any change in the characteristic of the AGC 6, the level of the video signal obtained by photography at the high shutter speed and the level of the video signal obtained by photography at the ordinary shutter speed will become equal.

FIG. 12 is a block diagram illustrating the construction of part of the PI signal generating circuit 20A. This circuit is obtained by eliminating the register 23 from the circuit depicted in FIG. 2.

More specifically, the PI signal generating circuit 20A includes the counter 21 and the encoder 22. The clock signal CK outputted by the SSG 13 is applied to the counter 21 and encoder 22, and the horizontal synchronizing signal HD and vertical synchronizing signal VD are applied to the counter 21.

The counter 21 includes a first counter for counting the horizontal synchronizing signal HD and a second counter for counting the vertical synchronizing signal VD. The value 17 is preset in the first counter. The second counter counts a value indicating the period (e.g., 18 fields) at which photography is to be performed at the high shutter speed and repeats this counting operation at the above-mentioned period. When the above-mentioned period has been counted, the second counter generates a first signal and applies it to the encoder 22.

On the basis of entry of the vertical synchronizing signal VD, the first counter of the counter 21 counts the horizontal synchronizing signal HD that enters from the beginning of the vertical blanking interval, detects the 17th horizontal synchronizing signal HD of the vertical blanking interval and applies a detection signal to the encoder 22. When the detection signal indicative of detection of the horizontal synchronizing signal enters, the encoder 22 generates the PI signal (FIG. 13) if the first signal is not entering from the second counter. The PI signal is applied to the combining circuit 8.

Further, in response to the first signal provided by the second counter, the encoder 22 outputs an interval timing pulse. The interval timing pulse is applied to the system controller 120. The latter responds to entry of the interval timing pulse by commanding the shutter control circuit 12 to operate at the high shutter speed in the next field interval.

As set forth above, performing photography at the high shutter speed one time periodically over a number of fields which is a multiple of six makes it possible to prevent a reproduced image from being influenced by flickering as caused by a fluorescent lamp. The principle according to which this is performed will now be described.

Figure 14:
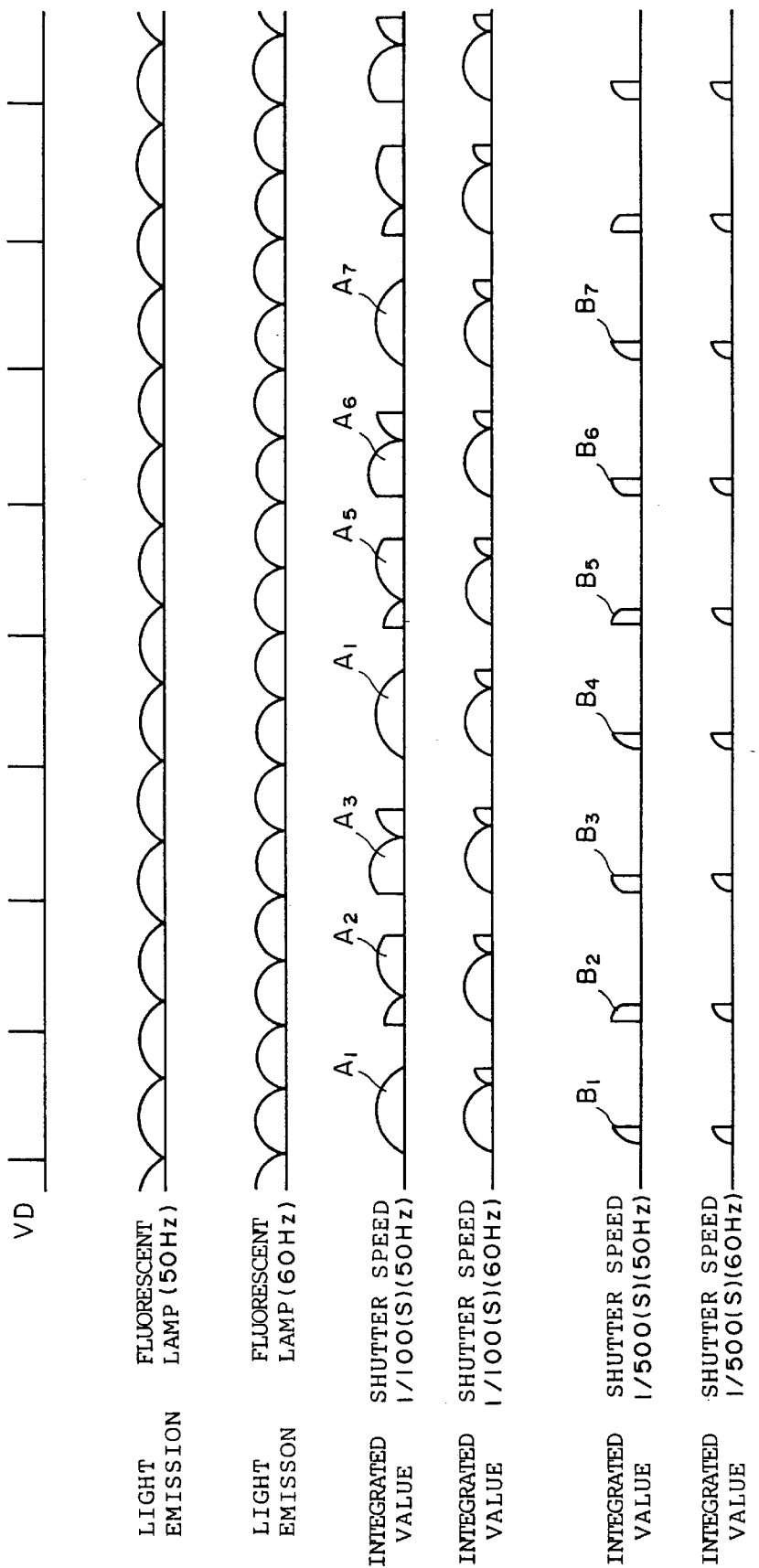
FIGS. 14a–14g are time charts for describing the prevention of flicker.

FIG. 14 illustrates a vertical synchronizing signal VD, light emission in a case where a fluorescent lamp is lit by an alternating current having a repetition frequency of 50 Hz, light emission in a case where a fluorescent lamp is lit by an alternating current having a repetition frequency of 60 Hz, and integrated values of light incident upon a camera when the fluorescent lamp is lit at 50 Hz or 60 Hz in photography performed at each of the shutter speeds of $\frac{1}{100}$ of a second and $\frac{1}{500}$ of a second.

When the fluorescent lamp is lit by the alternating current having the repetition frequency of 50 Hz, the period of the light emission is $\frac{1}{100}$ of a second. When the fluorescent lamp is lit by the alternating current having the repetition frequency of 60 Hz, the period of the light emission is $\frac{1}{120}$ of a second. On the other hand, the period of photography in a video camera is $\frac{1}{60}$ of a second. Since the repetition frequency of light emission from a fluorescent lamp driven at 60 Hz is 120 Hz, the integrated values in each type of photography performed under light from a fluorescent lamp driven at 60 Hz are identical values at all times. By contrast, when photography is performed under light from a fluorescent a lamp (light emission at 100 Hz) driven at 50 Hz, the integrated values differ (compare $A_1$, $A_2$ and $A_3$ or $B_1$, $B_2$ and $B_3$). This causes flickering.

Since the least common multiple of $\frac{1}{60}$ and $\frac{1}{100}$ is $\frac{1}{20}$, the integrated values will be the same every $\frac{1}{20}$ of a second, i.e., every three fields, even if photography is performed under a fluorescent lamp driven at 50 Hz. Flickering is thus prevented. Accordingly, the integrated values $A_1$ and $A_4$ obtained every three fields will be equal or the integrated values $B_1$ and $B_4$ obtained every three fields will be equal. However, the amount of light produced when a fluorescent lamp is discharged from right to left differs from that produced when the fluorescent lamp is discharged from left to right. Consequently, the integrated values will be equal every six fields and flickering will be prevented. In other words, the integrated values $A_1$ and $A_7$ will be equal and so will the integrated values $B_1$ and $B_7$.

In the video camera illustrated in FIG. 10, photography at the high shutter speed is performed one time every number of fields which is a multiple of six (every six fields, every 12 fields or every 18 fields, etc.). As a result, the integrated values of the video signals at each high-speed photography timing will be the same and flickering can be prevented.

Fourth Embodiment

Figure 15:
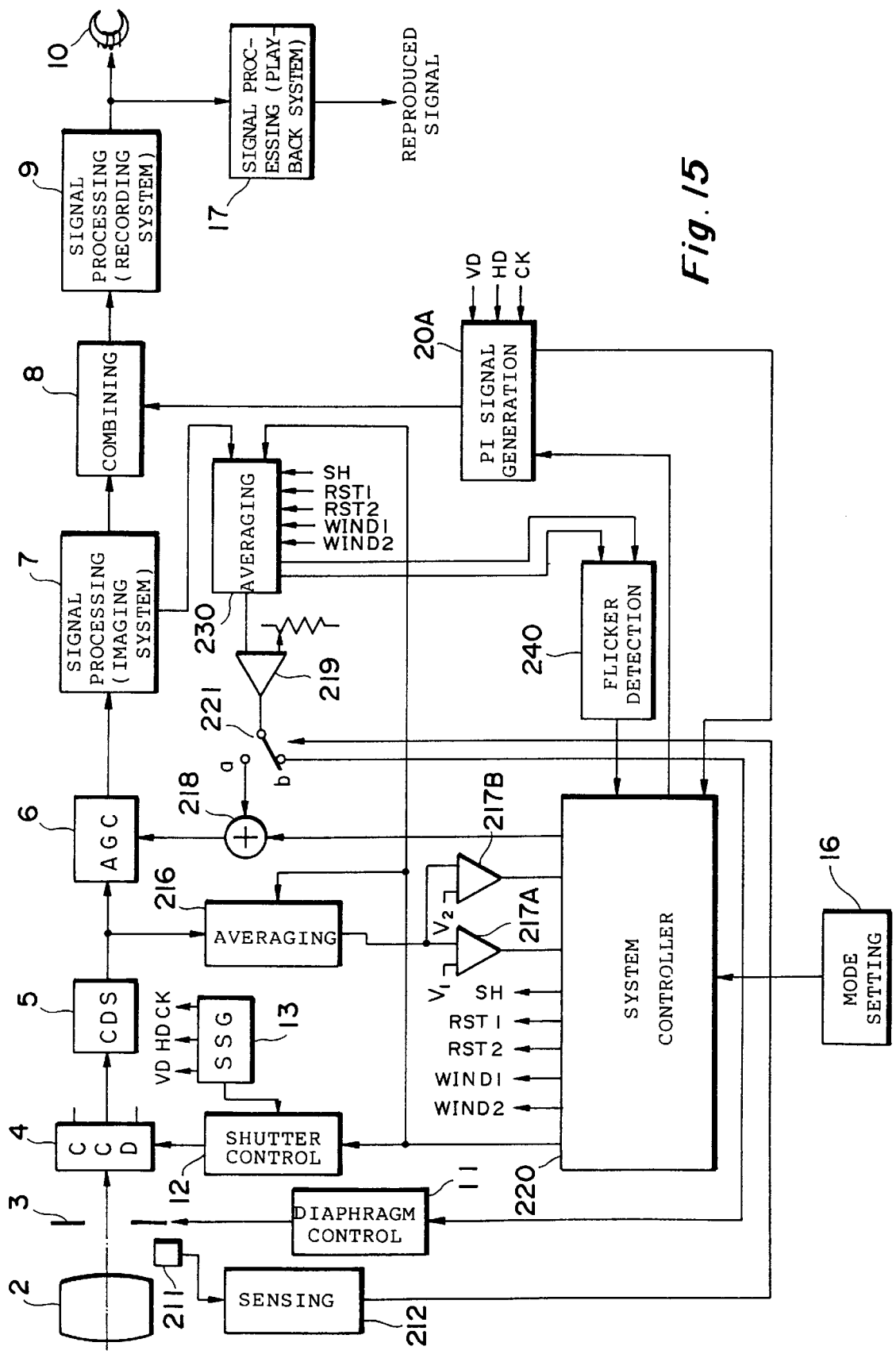
FIG. 15 is a block diagram illustrating the electrical configuration of a video camera according to a fourth embodiment of the present invention.
Figure 16:
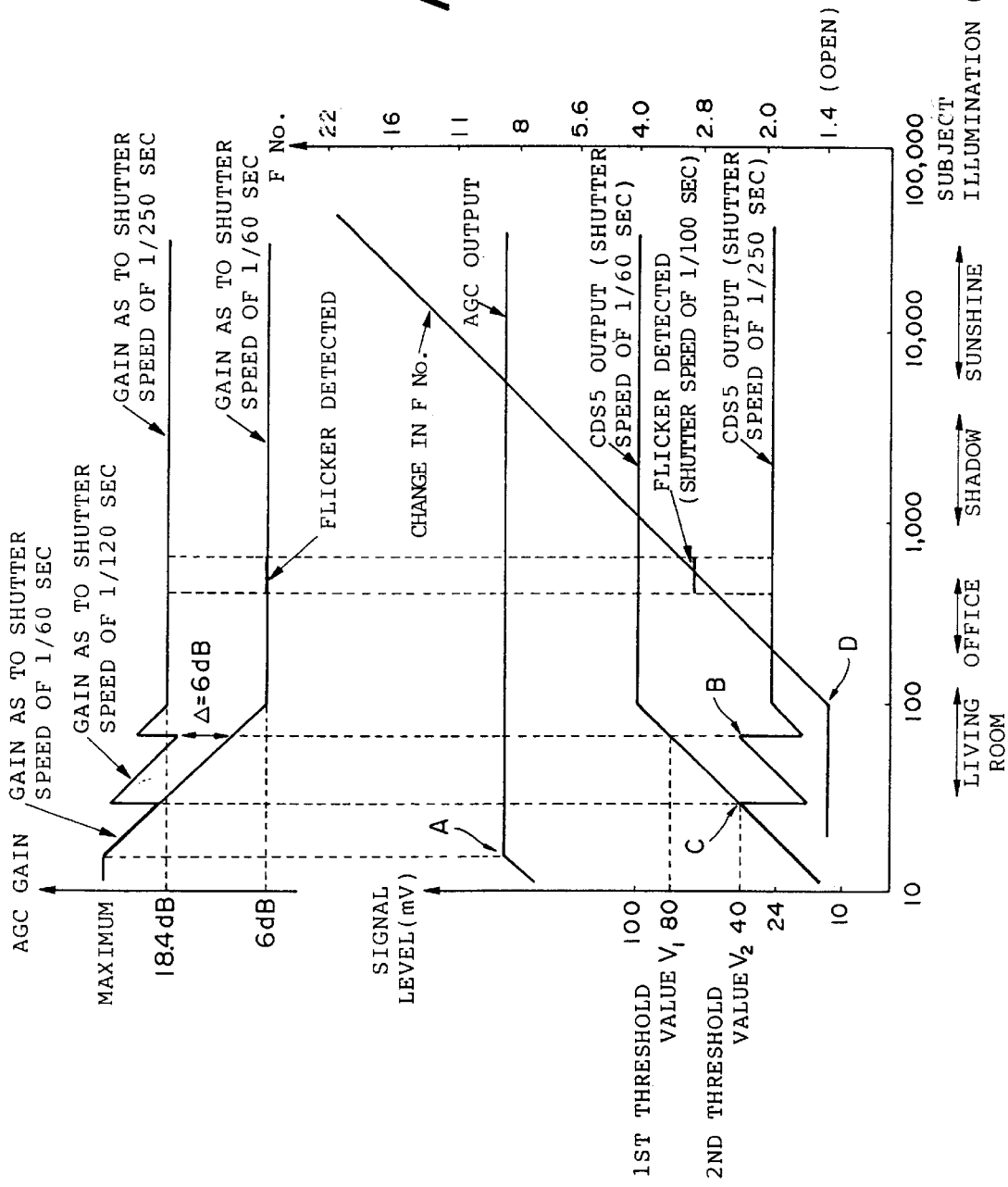
FIGS. 16a and 16b are graphs illustrating the relationship among subject brightness, the average level of a video signal, F number and gain.

FIG. 15, which is for describing a fourth embodiment of the invention, is a block diagram illustrating the electrical configuration of a video camera according to this embodiment. FIG. 16 is a graph illustrating the level of the video signal versus the brightness of a subject when photography is performed using the video camera shown in FIG. 15. The graph also illustrates the prevailing F number and a change in the amplification factor of the automatic gain control circuit 6 contained in the video camera. FIGS. 3a and 3b illustrating the recording formats of the video camera are used in this embodiment as well.

The video camera includes the mode setting button 16 which makes it possible to set the movie photography mode, the interval photography mode and the sports photography mode. As set forth earlier, the movie photography mode is the ordinary photography mode in which a subject is photographed continuously at a shutter speed of 1/60 of a second at all times. The interval photography mode is a mode in which a subject is photographed continuously over a prescribed plurality of fields at a shutter speed of 1/60 of a second, with photography being performed periodically at a high shutter speed (e.g., 1/250 of a second) in just one field (or one frame) among these plurality of fields. The sports photography mode is a mode in which a subject is photographed continuously at a high shutter speed at all times.

A signal representing the mode set by the mode setting button 16 is applied to a system controller 220. On the basis of the entered mode setting signal, the system controller 220 outputs a shutter control signal to control the shutter control circuit 12, whereby photography conforming to each mode is carried out. In the description that follows, a case will be discussed in which the interval photography mode has been set by the mode setting switch 16.

The video camera is provided with a Hall device 211 and sensing circuit 212 in order to sense whether the diaphragm has been opened fully. The arrangement is such that the Hall voltage of the Hall device 211 varies in response to the diaphragm 3 being opened fully. The change in the Hall voltage of the Hall device 211 is sensed by the sensing circuit 212, whereby it is sensed that the diaphragm 3 is opened fully. The output signal of the sensing circuit 212 indicating that the diaphragm 3 is in the fully open state is sent from the circuit 212 to a switch circuit 221 as a switch-changeover control signal.

A light image representing the image of a subject formed by the image pick-up lens 2 is acted upon by the diaphragm 3 controlled by the diaphragm control circuit 11, whereby the image of the subject is formed on the CCD 4.

In the interval photography mode, an electronic shutter operation is performed in the CCD 4 under the control of the shutter control circuit 12 in such a manner that the sequence comprising the continuous exposure over a prescribed plurality of times at the ordinary shutter speed of 1/60 of a second and the single exposure at the high shutter speed of 1/250 of a second is repeated. This operation is illustrated in FIGS. 3a and 3b, in which the hatched portions indicate fields in which photography is performed at the high shutter speed and the other portions indicate fields in which photography is performed at the ordinary shutter speed. FIG. 3a depicts field recording and FIG. 3b frame recording. In the field mode, photography is performed at the high shutter speed one time in 16 fields. In the case of frame recording, photography is carried out at the high shutter speed with regard to two successive fields in photography performed 16 times. It goes without saying that readout of the video signal from the CCD 4 is executed every 1/60 of second, just as in an ordinary video camera, without relation to the value of shutter speed.

When the illumination of the subject is low, the shutter speed is adjusted by the shutter control circuit 12 in such a manner that the output signal of the automatic gain control circuit 6 is maintained at a constant level in order to obtain a reproduced image having a suitable brightness.

As will be described later, a PI signal is superposed on the video signal obtained by photography at the ordinary shutter speed, this video signal being among those outputted by the CCD 4. The manner in which the PI signal is inserted also is shown in FIGS. 3a and 3b.

The video signal outputted by the CCD 4 is applied to the automatic gain control circuit 6 and an averaging circuit 216 via the CDS (correlated double-sampling circuit) 5.

The averaging circuit 216 outputs the average level of one field of the video signal and is realized by an integrating circuit, by way of example. The averaging circuit 216 and an averaging circuit 230, described later, are controlled by a system controller 220 so as to calculate the average level of the first video signal obtained by photography at the ordinary shutter speed.

A voltage representing the average value outputted by the averaging circuit 216 is applied to comparators 217A and 217B. The comparator 217A is set to 80 mV as a first threshold value $V_1$. When the voltage that enters from the averaging circuit 216 is less than 80 mV, the comparator 217A provides the system controller 220 with a signal indicative of this fact. The comparator 217B is set to 40 mV as a second threshold value $V_2$ that is lower than the first threshold voltage $V_1$. When the voltage that enters from the averaging circuit 216 is less than 40 mV, the comparator 217b provides the system controller 220 with a signal indicative of this fact.

The automatic gain control circuit 6 amplifies the entering video signal using an amplification factor of 6 dB or 18.4 dB based upon the gain control signal provided by the system controller 220. The automatic gain control circuit 6 uses the amplification factor of 6 dB to amplify the first video signal obtained at the ordinary shutter speed, uses the amplification factor of 18.4 dB to amplify the second video signal obtained at the high shutter speed and performs an adjustment in such a manner that the average levels of the two amplified video signals will become approximately equal.

The video signals whose levels have thus been adjusted by the automatic gain control circuit 6 are applied to the signal processing circuit 7 for the image sensing system. The signal processing circuit 7 subjects the video signals to processing for adjusting the color balance of these signals and performing a gamma correction, and generates a luminance signal and color-difference signals. The signals obtained are applied to the combining circuit 8.

The luminance signal generated by the signal processing circuit 7 for the image sensing system is applied to the averaging circuit 230 as well.

The averaging circuit 230 averages the luminance signal of the currently entering field, provides a differential amplifier circuit 219 with a signal representing the average level and provides a flicker detecting circuit 240 with a signal representing the average level of the luminance signal of the current field and a signal representing the average level of the luminance signal of the field immediately preceding the current field.

A differential output representing the difference between the output level of the averaging circuit 230 and a predetermined suitable reference level is obtained by the differential amplifier circuit 219. The output voltage of the differential amplifier circuit 219 is applied to the diaphragm control circuit 11 via a switch circuit 221 until the diaphragm 3 is opened fully. As a result, the opening/closing of the diaphragm 3 is controlled in such a manner that the output video signal of the CDS 5 will attain a fixed level in conformity with the shutter speed, e.g., 100 mV in the case of the first video signal obtained at the ordinary shutter speed and 24 mV in case of the second video signal obtained at the high shutter speed.

On the basis of the signal representing the average level of the luminance signal of the currently entering field and the signal representing the average level of the luminance signal of the immediately preceding field, the flicker detecting circuit 240 detects whether flicker caused by fluorescent lighting, for example, is contained in the current video signal. When flicker is detected, the circuit 240 provides the system controller 220 with a signal to this effect, and the shutter control circuit 12 is controlled in such a manner that the shutter speed in case of both the high shutter speed and ordinary shutter speed will become $1/100$ of a second. The reason for this will be described later.

The video camera further includes the PI signal generating circuit 20A. The latter is provided with the horizontal synchronizing signal HD, the vertical synchronizing signal VD and the clock signal CK from the SSG (synchronizing signal generating circuit) 13. On the basis of these input signals, the PI signal generating circuit 20A generates the PI signal, the information signal representing print information and the interval timing pulses that decide the period of photography at the high shutter speed. The interval timing pulses are applied to the system controller 220 and the PI signal is applied to the combining circuit 8. The circuit 20A has the construction shown in FIG. 12.

The combining circuit 8 superposes the PI signal outputted by the PI signal generating circuit 20A on the video signals (at least the luminance signal) outputted by the signal processing circuit 7 for the image sensing system.

An example of the PI signal is shown in FIG. 13 already described.

The PI signal illustrated in FIG. 13 is inserted in an initial interval IT of a vertical blanking interval associated with the video signal obtained by performing photography at the ordinary shutter speed of $1/60$ of a second. The PI signal is not inserted in a vertical blanking interval associated with the video signal obtained by performing photography at the high shutter speed.

The vertical blanking interval associated with the video signal preferably is a vertical blanking signal that appears immediately ahead of this video signal.

The PI signal is outputted by the PI signal generating circuit 20A at a timing at which it will be superposed upon the video signal between the 17th and 18th horizontal synchronizing signals in the vertical blanking interval, as shown in FIGS. 4a and 4b already described.

The video signal outputted by the combining circuit 8 is applied to the signal processing circuit 9 for the recording system. The video signal is subjected to recording processing such as pre-emphasis and frequency modulation processing by the recording processing circuit 9, after which the processed video signal is recorded on a video tape by the recording playback head 10.

The video camera shown in FIG. 15 can perform reproduction processing as well and includes the signal processing circuit 17 for the playback system. This circuit is identical with that described earlier in connection with the first embodiment.

Operation of the video camera in conformity with the illumination of the subject will now be described with particular reference to FIG. 16. In this operation also the interval photography mode is set, the high shutter speed is set to $1/250$ of a second as a first high shutter speed, and the ordinary shutter speed is set to $1/60$ of a second.

When the illumination of the subject is 1,000~100,000 lx and the subject is in shade or sunshine, the video signal obtained at the high shutter speed ($1/250$ of a second) is amplified at the amplification factor of 18 dB and the video signal obtained at the ordinary shutter speed ($1/60$ of a second) is amplified at the amplification factor of 6 dB. As a result, the average level of the video signal obtained by photography at the high shutter speed and the average level of the video signal obtained by photography at the ordinary shutter speed become approximately equal.

The switch circuit 221 is connected to the side of a b terminal so that the diaphragm 3 is controlled by the control circuit 11 in such a manner that the average level of the video signal outputted by the CDS 5 is held at 24 mV with regard to the second video signal obtained by photography at the high shutter speed and at 100 mV with regard to the first video signal obtained by photography at the ordinary shutter speed.

Next, assume that the subject is inside a room and that flickering of fluorescent lighting or the like has been detected by the flicker detection circuit 240. Further, assume that the fluorescent lamp is being fired by an AC power supply having a commercial power-supply frequency of 50 Hz, as is the case in the Kanto district of Japan.

When flicker is detected, either the shutter speed that was the high speed ($1/250$ of second) or the shutter speed that was the ordinary speed ($1/60$ of second) is set to the shutter speed of $1/100$ of a second and the subject is photographed. Since there is no distinction between the high shutter speed and the ordinary shutter speed, the automatic gain control circuit 6 always performs amplification at the amplification factor of 6 dB at all times. The AC power-supply frequency of the Kanto district is 50 Hz, the period thereof is $1/50$ of a second and the shutter speed is set to $1/100$ of a second, which is the AC power-supply period of $1/50$ of a second multiplied by a factor of ½. Consequently, as will be described below, it is possible to prevent flickering of the reproduced image caused by flicker ascribable to the fluorescent lighting or the like. Further, the AC power-supply frequency of the Kansai district of Japan is 60 Hz. Therefore, when flicker is detected in a video camera used primarily in the Kansai district, the shutter speed is set to $1/120$ of a second, which is the AC power-supply period of $1/60$ of a second multiplied by a factor of ½.

Even if flicker is detected and the shutter speed is set to $1/100$ of a second, the shutter speed is higher than the ordinary shutter speed of $1/60$ of a second and is suited to still reproduction. This means that the processing for superposing the PI signal is not executed at all with regard to the video signal.

A case will now be considered in which a subject located in a living room is photographed.

As the illumination of a subject diminishes, the diaphragm 3 is gradually opened based upon the output of differential amplifier circuit 219 in such a manner that the average level of the output video signal from the CDS 5 will attain a constant level (100 mV or 24 mV) in dependence of the shutter speed. When the illumination of the subject becomes too low, the average level of the output video signal from the CDS 5 can no longer be held at the constant level conforming to the shutter speed even if the diaphragm 3 opened fully. In such a case, the following operation is carried out:

The fact that the diaphragm 3 has been opened is sensed by the Hall device 211 and sensing circuit 212. When the diaphragm 3 is opened, the signal from the sensor indicative of this fact is applied to the switch circuit 221, which is connected to the side of the a terminal. Owing to the connection of the switch circuit 221 to the a terminal, the differential output of the differential amplifier circuit 219 is applied to an adder circuit 218.

The gain control signal outputted by the system controller 220 and the differential output of the differential amplifier circuit 219 are added by the adder circuit 218, and the resulting sum is applied to the automatic gain control circuit 6 as a new gain control circuit. The differential output of the differential amplifier circuit 219 is applied to the adder circuit 218 irrespective of photography at the ordinary shutter speed and photography at the high shutter speed. Accordingly, the amplification factor of 6 dB at the time of the ordinary shutter speed and the amplification factor of 18.4 dB at the time of the high shutter speed are both enlarged. As a result, the average level of the output video signal from the automatic gain control circuit 6 will be held substantially at a fixed level even if the illumination of the subject changes.

Assume that the subject is in a comparatively dark location in a living room.

Since the diaphragm 3 will already be open, the lower the illumination of the subject, the lower the average level of the output video signal of the CDS 5 will be, regardless of whether the video signal is one obtained by photography at the ordinary shutter speed or one obtained by photography at the high shutter speed.

When the average level of the video signal obtained at the ordinary shutter speed falls below the first threshold level $V_1$, this is sensed by the comparator 217A, whose output signal indicative of this fact is applied to the system controller 220. When this occurs, the shutter control circuit 12 is controlled in such a manner that the first high shutter speed of $\frac{1}{250}$ of a second will become a second high shutter speed of $\frac{1}{120}$ of a second that is lower than the first shutter speed of $\frac{1}{250}$ of a second but higher than the ordinary shutter speed of $\frac{1}{60}$ of a second, as illustrated at point B in FIG. 16.

The exposure time is lengthened by changing over the first high shutter speed to the second high shutter speed. As a consequence, the level of the second video signal outputted by the CCD 4 also rises and the level of the video signal outputted by the AGC 6 can be held at a fixed level.

Operation is as follows in a case where the subject is in a very dark location and is photographed.

Assume that the level of the video signal outputted by the CDS 5 falls further for both the first video signal and the second video signal, and that the average level of the first video signal attains the second threshold value V2, as indicated at point C. When the average level of the first video signal attains the second threshold value V2, a signal indicative of this fact is outputted by the comparator 217B and enters the system controller 220.

In response to the input from the comparator 217B, the system controller 220 controls the shutter control circuit 12 in such a manner that the second high shutter speed of $\frac{1}{120}$ of a second becomes the ordinary shutter speed of $\frac{1}{60}$ of a second. In this case, the high shutter speed and the ordinary shutter speed are no longer distinguishable from each other. Photography is performed at the ordinary shutter speed at all times and there is no image obtained by photography at a shutter speed higher than the ordinary shutter speed. As a consequence, the video signal prevailing at this time is not suited to still playback. The PI signal, therefore, is superposed upon all vertical blanking intervals of the video signal.

Further, if the subject is in a location even darker than that mentioned above, the average value of the output video signal of the automatic gain control circuit 6 can no longer be maintained at the fixed level even by the shutter speed adjustment and the amplification processing that is performed by the automatic gain control circuit 6. The average level begins to decline at point A in FIG. 16.

Flicker detection processing will now be described.

Figure 17:
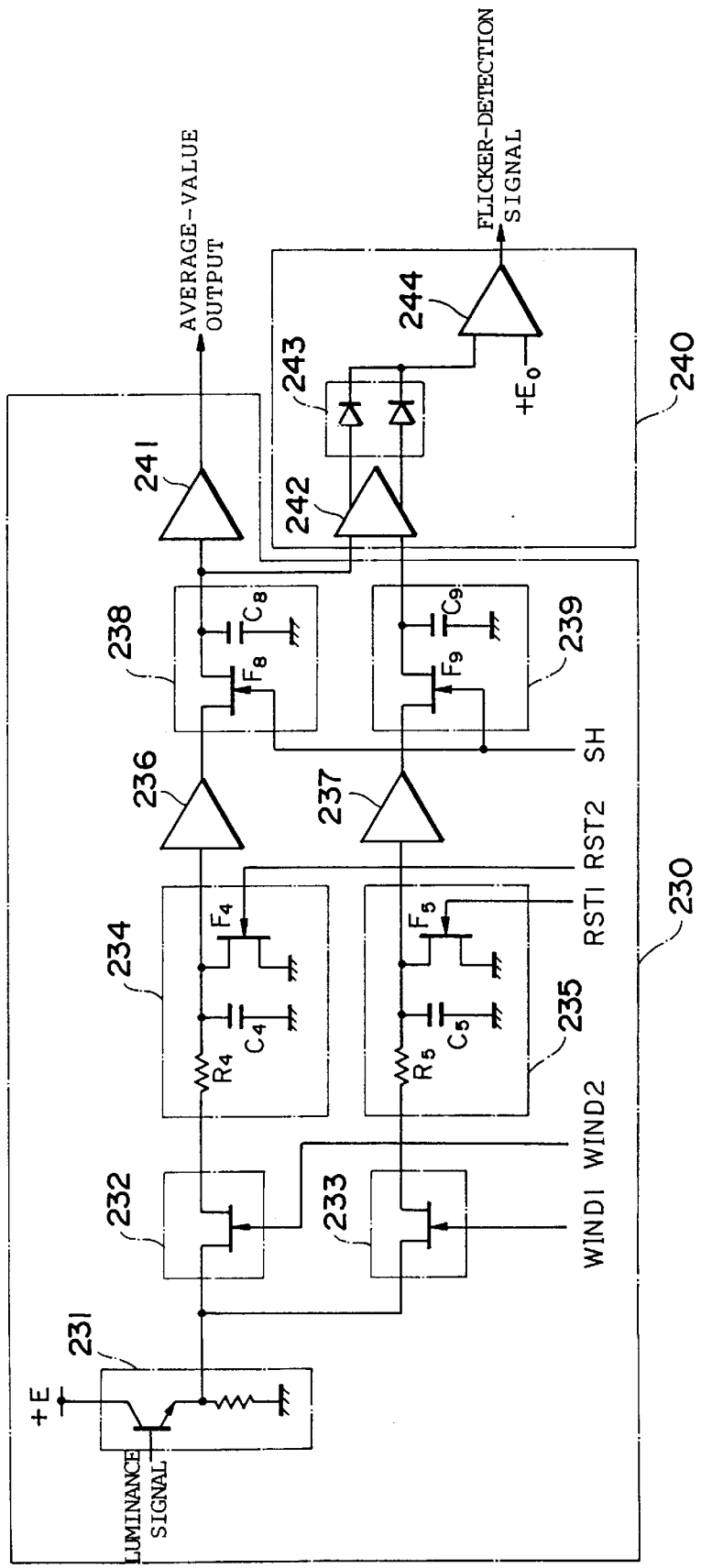
FIG. 17 is a circuit diagram showing an example of the construction of an averaging circuit and flicker detecting circuit; an FIGS. 18a–18k are time charts showing input and output signals of each circuit illustrated in FIG. 17.

FIG. 17 shows the electrical configuration of the averaging circuit 230 and flicker detecting circuit 240, and FIG. 18 is a time chart showing input and output signals of each circuit illustrated in FIG. 17. The averaging circuit 216 of FIG. 15 also has a construction substantially the same as that of the circuit 230 shown in FIG. 17.

The luminance signal produced by the signal processing circuit 7 for the image sensing system is applied to gate circuits 232, 233 via a buffer circuit 231. The gate circuit 233 is controlled by a window signal WIND1 outputted by the system controller 220, and the gate circuit 232 is controlled by a window signal WIND2 outputted by the system controller 220.

The window signal WIND1 is outputted by the system controller 220 at a timing at which one field of the video signal obtained by photography at the high shutter speed is extracted, and the window signal WIND2 is outputted by the system controller 220 at a timing at which the field next to the field of the video signal obtained by photography at the high shutter speed is extracted. The window signal WIND1 need not necessarily be outputted in the field of the video signal resulting from photography at the high shutter speed.

The video signals that pass through the gate circuits 232 and 233 are applied to integrating circuits 234 and 235, respectively.

The integrating circuit 234 comprises a capacitor $C_4$ and an FET $F_4$. The system controller 220 applies a reset signal RST2 to the integrating circuit 234 before the window signal WIND2 is outputted, thereby resetting the integrating circuit 234 (discharging the electric charge in the capacitor C4 through the FET $F_4$).

The integrating circuit 235 comprises a capacitor $C_5$ and an FET $F_5$. The system controller 220 applies a reset signal RST2 to the integrating circuit 235 before the window signal WIND1 is outputted, thereby resetting the integrating circuit 235 (discharging the electric charge in the capacitor $C_5$ through the FET $F_5$).

By applying the reset signal RST1 to the integrating circuit 235, the electric charge in the capacitor $C_5$ is cleared and the electric charge of the video signal obtained by photography at the high shutter speed accumulates in the capacitor $C_5$. By applying the reset signal RST2 to the integrating circuit 234, the electric charge in the capacitor $C_4$ is cleared and the electric charge of the video signal obtained by photography at the ordinary shutter speed accumulates in the capacitor $C_4$.

The output of the integrating circuit 235 is applied to a sample-and-hold circuit 239 via a buffer amplifier circuit 237, and the output of the integrating circuit 234 is applied to a sample-and-hold circuit 238 via a buffer amplifier circuit 236.

The sample-and-hold circuit 239 comprises a FET $F_9$ and a capacitor $C_9$, and the sample-and-hold circuit 238 comprises a FET $F_8$ and a capacitor $C_8$. A sample-and-hold pulse SH is applied to the sample-and-hold circuits 238 and 239 at a timing corresponding to the beginning of the field that follows the field in which the window signal WIND2 is outputted. As a result, the signals inputted to the circuits 238, 239 are held.

The output of the sample-and-hold circuit 238 is applied to a buffer amplifier circuit 241 and a differential amplifier circuit 242. The output of the buffer amplifier circuit 241 is a signal indicating the averaged level of the first video signal (obtained at the ordinary shutter speed).

The output of the sample-and-hold circuit 239 is applied to the differential amplifier circuit 242. The latter detects the difference between the average level of the video signal obtained by photography at the high shutter speed and the average level of the video signal (obtained at the ordinary shutter speed) of the field following the video signal obtained by photography at the high shutter speed. The output of the differential amplifier circuit 242 is applied to an absolute-value circuit 243, whereby the absolute value of this signal is obtained.

When the subject is under flickering illumination as when a fluorescent lamp or the like is used for illumination, the luminance of the subject fluctuates in conformity with the flickering and therefore brightness differs from one picture to the next. In other words, the average levels of two successive fields of the video signal differ. Accordingly, by comparing the average levels of two fields of the video signal representing successive images, as set forth above, it can be determined whether flickering will appear in the reproduced image.

The output of the absolute-value circuit 243 is applied to the comparator 244. The latter compares the difference between the average levels of the two video signals with a threshold value $E_0$ and outputs a flicker-detection signal if the difference between the average levels is greater than the threshold value. The flicker-detection signal is applied to the system controller 220, as described above.

The processing for generating and superposing the PI signal is identical with that of the third embodiment.

The period of photography based upon the high shutter speed preferably is in the range of 16 to 60 fields. The reason for this is that if photography at the high shutter speed is performed one time in 16 fields, images played back in the form of a movie will not look unusual. And if photography at the high shutter speed is performed one time in 60 fields, i.e., in one second, good photo opportunities will not be lost.

In the above-described embodiment, if the interval photography mode has been set, photography is performed at the high shutter speed of $1/250$ of a second one time in 16 fields, and photography is performed at the ordinary shutter speed of $1/60$ of a second in the other fields, when the subject is outdoors in shadow or sunlight or even when the subject is indoors but in a comparatively bright location such as an office. The first video signal is amplified at the amplification factor of 6 dB and the second video signal is amplified at the amplification factor of 18.4 dB in such a manner that the average level of the first video signal obtained by photography at the ordinary shutter speed and the average level of the second video signal obtained by photography at the high shutter speed become approximately equal. The difference between these amplification factors is 12.4 dB.

When photography is performed at the ordinary shutter speed of $1/60$ of a second, this is not suited to still playback and the PI signal is superposed upon the video signal for this reason. When photography is performed at the high shutter speed of $1/250$ of a second, this is suited to still playback and therefore the PI signal is not superposed upon the video signal. By detecting whether or not the PI signal is present at the time of playback, the second video signal suited to still playback can be extracted.

When flicker is detected, the shutter speeds of both $1/250$ of a second and $1/60$ of a second are both set to $1/100$ of a second to prevent the reproduced image from being affected by flickering ascribable to light from a fluorescent lamp or the like.

The opening/closing of the diaphragm is controlled in dependence upon the illumination of the subject in such a manner that the average level of the video signal outputted by the CDS 5 will be 100 mV with respect to the first video signal and 24 mV with respect to the second video signal.

When the diaphragm is opened in the dark circumstance, the output of the automatic gain control circuit 6 declines. In order to maintain a constant level, therefore, an adjustment is made in conformity with the illumination of the subject in such a manner that the amplification factor of the first video signal and the amplification factor of the second video signal will rise.

When the average level of the first video signal outputted by the CDS 5 falls below the first threshold value $V_1$, the first high shutter speed of $1/250$ of a second is changed to the second high shutter speed of $1/120$ of a second. When the average level of the first video signal falls below the second threshold value $V_2$, the second high shutter speed of $1/120$ of a second is changed to the ordinary shutter speed of $1/60$ of a second.

It is permissible to adopt an arrangement in which, when the average level of the first video signal falls below the first threshold value $V_1$, the first high shutter speed of $1/250$ of a second is changed to the second high shutter speed of $1/120$ of a second and, when the average level of the first video signal falls below the second threshold value $V_2$, the second high shutter speed of $1/120$ of a second is changed to a third high shutter speed of $1/100$ of a second.

Furthermore, a third threshold value may be set that is lower than the second threshold value. In such case, the third high shutter speed of $1/100$ of a second would be changed to the ordinary shutter speed of $1/60$ of a second in response to the average level of the first video signal falling below the third threshold value. When the third threshold value is set, one more comparator to which the output signal of the averaging circuit 216 is applied would be provided in order to detect that the average level of the first video signal has fallen below the third threshold value.

Further, in the foregoing embodiment, the high shutter speed is changed over from $1/250$ of a second to $1/120$ of a second in response to the average level of the first video signal outputted by the CDS 5 falling below the first threshold value $V_1$, and the high shutter speed is changed over from $1/120$ of a second to $1/60$ of a second in response to the average level of the first video signal falling below the second threshold value $V_2$. However, an arrangement may be adopted in which the high shutter speed is varied from $1/250$ of a second to $1/60$ of a second continuously in dependence upon the average level of the first video signal, or, in other words, in conformity with the illumination of the subject.

In the foregoing embodiment, the opening/closing of the diaphragm is controlled in conformity with the illumination of the subject. However, the output of the automatic gain control circuit 6 can be held at a constant level also by varying the amplification factors of the automatic gain control circuit with respect to the first and second video signals in conformity with the illumination of the subject without controlling the diaphragm.

Furthermore, in foregoing embodiment, the high shutter speed and ordinary shutter speed are both changed to the shutter speed of $\frac{1}{100}$ of a second when flickering of light from a fluorescent lamp is detected. However, an arrangement may be adopted in which these shutter speeds are changed to the ordinary shutter speed of $\frac{1}{60}$ of a second when the illumination of the subject is low. Further, when flickering is detected, the high shutter speed and ordinary shutter speed may both be changed to the ordinary shutter speed of $\frac{1}{60}$ of a second irrespective of the magnitude of the subject illumination. Since this would be unsuitable for still reproduction, the PI signal would be superposed upon the vertical blanking intervals of the video signal in all fields.

As many apparently widely different embodiments of the present invention can be made without departing from the spirit and scope thereof, it is to be understood that the invention is not limited to the specific embodiments thereof except as defined in the appended claims.

What is claimed is:

1. A video camera comprising:
   shutter implementing device periodically performing exposure one time at a first relatively high shutter speed for every n successive frames and for performing exposure n−1 times at an ordinary shutter speed, relatively longer than the first relatively high shutter speed, wherein n is an integer;
   photographic device outputting a first video signal when exposure is performed at the ordinary shutter speed and a second video signal when exposure is performed at the first relatively high shutter speed;
   an amplifier circuit amplifying the first and second video signals, outputted by said photographic device, at mutually different amplification factors such that an average level of the second video signal becomes approximately equal to an average level of the first video signal;
   flicker discriminator discriminating whether or not a difference between average levels of video signals representing two successive frames among the video signals amplified by said amplifier circuit is greater than a predetermined threshold value and for detecting when the difference is greater than the predetermined threshold value, thereby determining that flicker is caused in the video signal by an illuminating light; and
   controller, responsive to said flicker discriminator determining that flicker is caused in the video signal by the illuminating light, controlling said shutter implementing device such that at least one of the first relatively high shutter speed and the ordinary shutter speed in said shutter implementing device are varied to become identical shutter speeds, that correspond to a reciprocal of a positive whole-number multiplied by a period of an AC power supply of a light source generating the illuminating light, and controlling said amplifier circuit such that the amplification factors of said amplifier circuit become identical for the first and second video signals.

2. The video camera according to claim 1, wherein the shutter speed corresponding to the reciprocal of the period of the AC power supply is a value relatively longer in time than that of the first relatively high shutter speed and relatively shorter in time than the ordinary shutter speed.

3. The video camera according to claim 1, further comprising:
   brightness measuring device for measuring brightness of a subject; and
   shutter controller, responsive to the measured brightness of the subject being below a predetermined level, controlling said shutter implementing device such that the first relatively high shutter speed is changed to the ordinary shutter speed.

4. A video camera comprising:
   shutter implementing device periodically performing exposure one time at a relatively high shutter speed for every n successive frames and for performing exposure n−1 times at an ordinary shutter speed, relatively longer than the relatively high shutter speed, wherein n is an integer;
   photographic device outputting a first video signal when exposure is performed at the ordinary shutter speed and a second video signal when exposure is performed at the relatively high shutter speed;
   an amplifier circuit amplifying the first and second video signals, outputted by said photographic device, at mutually different amplification factors such that an average level of the second video signal becomes approximately equal to an average level of the first video signal;
   flicker discriminator discriminating whether or not a difference between average levels of video signals representing two successive frames among the video signals amplified by said amplifier circuit is greater than a predetermined threshold value and for detecting when the difference is greater than the predetermined threshold value, thereby determining that flicker is caused in the video signal by an illuminating light; and
   controller, responsive to said flicker discriminator determining that flicker is caused in the video signal by the illuminating light, for controlling said shutter implementing device such that the relatively high shutter speed in said shutter implementing device is lowered to equal to the ordinary shutter speed.

5. The video camera according to claim 4, further comprising:
   print-inhibit signal superposing device for superposing a print inhibit signal, inhibiting printing of an image represented by the first video signal, in a vertical blanking interval associated with the first video signal among the video signals outputted by said photographic device; and
   superposition controller, responsive to the determination made by said flicker discriminator that flicker is caused in the video signal, for controlling said print-inhibit signal superposing device to also superpose the print inhibit signal in a vertical blanking interval associated with the second video signal.

6. A method of controlling a video camera, comprising the steps of;
   periodically performing exposure one time at a relatively high shutter speed for every n successive frames and performing exposure n−1 times at an ordinary shutter speed, relatively longer than the relatively high shutter speed, wherein n is an integer;
   obtaining a first video signal when exposure is performed at the ordinary shutter speed and a second video signal when exposure is performed at the relatively high shutter speed;

amplifying the first and second video signals at mutually different amplification factors such that an average level of the second video signal becomes approximately equal to an average level of the first video signal;

discriminating whether or not a difference between average levels of video signals representing two successive frames in the amplified video signals is greater than a predetermined threshold value, thereby determining that flicker is caused in the video signal by an illuminating light; and changing the relatively high shutter speed and the ordinary shutter speed to be identical shutter speeds that corresponds to a reciprocal of a positive whole-number multiplied by a period of an AC power supply of a light source generating the illuminating light, and making the amplification factors of the first and second video signals identical, in response to the determining that flicker is caused in the video signal by the illuminating light.

7. The method according to claim 6, further comprising the steps of:

superposing a print inhibit signal, inhibiting printing of an image represented by the first video signal, in a vertical blanking interval associated with the first video signal; and executing processing for additionally superposing the print inhibit signal in a vertical blanking interval associated with the second video signal, in response to determining that flicker is caused in the video signal.

* * * * *